(12) United States Patent
McDaniel et al.

(10) Patent No.: US 11,384,175 B2
(45) Date of Patent: Jul. 12, 2022

(54) PREPARATION OF LARGE PORE SILICAS AND USES THEREOF IN CHROMIUM CATALYSTS FOR OLEFIN POLYMERIZATION

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); Carlton E. Ash, Owasso, OK (US); Stephen L. Kelly, Kingwood, TX (US); Amanda B. Allemand, The Woodlands, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/476,556

(22) Filed: Sep. 16, 2021

(65) Prior Publication Data
US 2022/0002449 A1    Jan. 6, 2022

Related U.S. Application Data

(62) Division of application No. 16/421,529, filed on May 24, 2019.

(51) Int. Cl.
*C08F 10/02*    (2006.01)

(52) U.S. Cl.
CPC .......... *C08F 10/02* (2013.01); *C08F 2410/04* (2013.01)

(58) Field of Classification Search
CPC .. C08F 10/02; C01P 2006/10; C01P 2006/12; C01P 2006/16
See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood |
| 4,041,224 A | 8/1977 | Hoff |
| 4,206,297 A | 6/1980 | Hoff |
| 4,279,879 A | 7/1981 | Winyall |

(Continued)

FOREIGN PATENT DOCUMENTS

| | | |
|---|---|---|
| CN | 105985462 B | 12/2018 |
| EP | 2607389 A1 | 6/2013 |

(Continued)

OTHER PUBLICATIONS

Arnett, et al., "Zero-Shear Viscosity of Some Ethyl Branched Paraffinic Model Polymers," J. Phys. Chem., vol. 84, 1980, pp. 649-652.

(Continued)

*Primary Examiner* — Catherine S Branch
(74) *Attorney, Agent, or Firm* — Merchant & Gould P.C.

(57) ABSTRACT

Silica composites and supported chromium catalysts having a bulk density of 0.08 to 0.4 g/mL, a total pore volume of 0.4 to 2.5 mL/g, a BET surface area of 175 to 375 $m^2/g$, and a peak pore diameter of 10 to 80 nm are disclosed herein. These silica composites and supported chromium catalysts can be formed by combining two silica components. The first silica component can be irregularly shaped, such as fumed silica, and the second silica component can be a colloidal silica or a silicon-containing compound, and the second silica component can act as a glue to bind the silica composite together.

29 Claims, 11 Drawing Sheets

(56) References Cited

U.S. PATENT DOCUMENTS

| | | |
|---|---|---|
| 4,301,034 A | 11/1981 | McDaniel |
| 4,339,559 A | 7/1982 | McDaniel |
| 4,345,055 A | 8/1982 | Hawley |
| 4,368,303 A | 1/1983 | McDaniel |
| 4,402,864 A | 9/1983 | McDaniel |
| 4,501,885 A | 2/1985 | Sherk |
| 4,547,557 A | 10/1985 | McDaniel |
| 4,588,790 A | 5/1986 | Jenkins, III |
| 4,794,096 A | 12/1988 | Ewen |
| 4,808,561 A | 2/1989 | Welborn, Jr. |
| 5,352,749 A | 10/1994 | Dechellis |
| 5,436,304 A | 7/1995 | Griffin |
| 5,565,175 A | 10/1996 | Hottovy |
| 5,575,979 A | 11/1996 | Hanson |
| 5,576,259 A | 11/1996 | Hasegawa |
| 5,739,220 A | 4/1998 | Shamshoum |
| 5,807,938 A | 9/1998 | Kaneko |
| 5,919,983 A | 7/1999 | Rosen |
| 6,239,235 B1 | 5/2001 | Hottovy |
| 6,262,191 B1 | 7/2001 | Hottovy |
| 6,489,428 B1 | 12/2002 | Debras |
| 6,833,415 B2 | 12/2004 | Kendrick |
| 7,128,884 B2 | 10/2006 | Kirkland |
| 7,271,122 B2 | 9/2007 | Bodart |
| 7,294,599 B2 | 11/2007 | Jensen |
| 7,531,606 B2 | 5/2009 | Hendrickson |
| 7,598,327 B2 | 10/2009 | Shaw |
| 7,601,665 B2 | 10/2009 | McDaniel |
| 7,700,516 B2 | 4/2010 | McDaniel |
| 7,884,163 B2 | 2/2011 | McDaniel |
| 7,906,603 B2 | 3/2011 | McDaniel |
| 8,076,262 B2 | 12/2011 | Cann |
| 8,114,946 B2 | 2/2012 | Yang |
| 8,222,470 B2 | 7/2012 | Coupard |
| 8,309,485 B2 | 11/2012 | Yang |
| 8,822,608 B1 | 9/2014 | Bhandarkar |
| 9,096,699 B2 | 8/2015 | McDaniel |
| 9,365,664 B2 | 6/2016 | Schmidt |
| 10,259,893 B1 | 4/2019 | McDaniel |
| 11,015,001 B2 | 5/2021 | Ye |
| 2003/0136739 A1 | 7/2003 | Kirkland |
| 2003/0232715 A1 | 12/2003 | Katzen |
| 2004/0059070 A1 | 3/2004 | Whitte |
| 2014/0275457 A1 | 9/2014 | McDaniel |
| 2015/0014850 A1 | 5/2015 | Hanbaek |
| 2015/0175726 A1 | 6/2015 | McDaniel |
| 2017/0015764 A1 | 1/2017 | Praetorius |
| 2017/0080406 A1 | 3/2017 | Praetorius |

FOREIGN PATENT DOCUMENTS

| | | |
|---|---|---|
| WO | 2008025515 A2 | 3/2008 |
| WO | 2019099291 A1 | 5/2019 |
| WO | 2019164712 A1 | 8/2019 |
| WO | 2020242797 A1 | 12/2020 |

OTHER PUBLICATIONS

Barrett, et al., "The Determination of Pore vol. and Area Distributions in Porous Substances. I. Computations From Nitrogen Isotherms," J. Am. Chem. Soc., vol. 73, Jan. 1951, pp. 373-380.

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Brunauer, et al., "Adsorption of Gases in Multimolecular Layers," Journal of the American Chemical Society. 1938, vol. 60, pp. 309-319.

Film Extrusion Manual—Process, Materials, Properties, TAPPI Press, 1992, 16 pages.

George Halsey, "Physical Adsorption on Non-Uniform Surfaces," Journal Chem. Phys., vol. 16, Mar. 9, 1948, pp. 931-937.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

International Search Report and Written Opinion issued in corresponding application No. PCT/US2020/033353 dated Jul. 31, 2020, 11 pages.

UPAC Compendium of Chemical Terminology, 2nd Ed. 1997, pp. 1-1670.

J. Forsman, et al., "Elasticity of a Percolation System: Silica Smoke," Can. J. Phys. vol. 65, 1987, pp. 767-771.

Janzen, et al., "Diagnosing Long-Chain Branching in Polyethylene," Journal of MoL Struct., 485/486, 1999, pp. 569-584.

Max P. McDaniel, et al., "Reinforcement of Cr/silica Catalysts by Secondary Deposition of Silicate Oligomers," Applied Catalysts A: General, Elsevier, Amsterdam, NL, vol. 554, Feb. 3, 2018, pp. 88-94.

Modern Plastics Encyclopedia, Mid-Nov. 1995 Issue, vol. 72, No. 12, 3 pages.

Paul J. DesLauries, et al., "Short Chain Branching Profiles in Polyethylene From the Phillips Cr/Silica Catalyst," Journal of Polymer Science Part A: Polymer Chemistry, vol. 45, No. 15, Aug. 1, 2007, pp. 3135-3149, XP055124768; ISSN: 0887-624X; DOI: 10.1002/pola.22174.

Youlu Yu, et al., "Long Chain Branches in Metallocene-Catalyzed Polyethylene Determined by a Combination of SEC/Multi Angle Light Scattering, NMR and Rheology," Polymer Preprint, vol. 44, 2003, pp. 49-50.

PREPARATION OF LARGE PORE SILICAS AND USES THEREOF IN CHROMIUM CATALYSTS FOR OLEFIN POLYMERIZATION

This application is a divisional application of U.S. patent application Ser. No. 16/421,529, filed on May 24, 2019, now U.S. Pat. No. 11,186,656, the disclosure of which is incorporated herein by reference in its entirety.

FIELD OF THE INVENTION

The present disclosure generally relates to supported chromium catalysts and titanated chromium catalysts, methods for preparing the supported catalysts, methods for using the catalysts to polymerize olefins, the polymer resins produced using such catalysts, and articles produced using these polymer resins. More particularly, the present disclosure relates to methods for making a silica composite with a substantial amount of large pores (e.g., greater than 10 nm or 30 nm in diameter), and the subsequent use of the large pore silica composite to produce supported chromium and titanated chromium catalysts.

BACKGROUND OF THE INVENTION

Chromium/silica catalysts and chromium/silica-titania catalysts can be used to make ethylene-based polymers, such as HDPE. However, the ability to manipulate or control the molecular weight, the molecular weight distribution, and the amount of long chain branching of such polymers, based solely on the physical structure of the catalyst and the silica-based support is not fully understood. It would be beneficial to modify certain physical parameters of the catalyst and support—such as surface area and pore volume—in order to manipulate or control important molecular weight and branching properties of the polymer, while maintaining high catalytic activity. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

In one aspect of this invention, a process for preparing a silica composite is disclosed, and in this aspect, the process can comprise (1) combining silica component I and silica component II in a diluent comprising at least about 70 wt. % water to form a mixture, and (2) forming the silica composite in the mixture. Silica component I can comprise irregular and non-spherical silica particles generally characterized by an average aspect ratio of at least about 2:1 and a BET surface area in a range from about 150 to about 1000 $m^2/g$, while silica component II can comprise a colloidal silica.

In another aspect of this invention, a process for preparing a silica composite is disclosed, and in this aspect, the process can comprise (1) combining silica component I and silica component II in a solvent to form a mixture, and (2) forming the silica composite in the mixture. Silica component I can comprise irregular and non-spherical silica particles generally characterized by an average aspect ratio of at least about 2:1 and a BET surface area in a range from about 150 to about 1000 $m^2/g$, while silica component II can comprise a silicon compound.

In another aspect of this invention, a process for preparing a supported chromium catalyst is disclosed, and in this aspect, the process can comprise combining (before calcining or during calcining) a chromium-containing compound and an optional titanium-containing compound with the silica composite to form the supported chromium catalyst.

In yet another aspect of this invention, a process for preparing a supported chromium catalyst is disclosed, and in this aspect, the process can comprise (1) combining a chromium-containing compound and an optional titanium-containing compound with any silica component I and silica component II described herein in a diluent or solvent to form a mixture, and (2) forming the supported chromium compound in the mixture.

Silica composites and supported chromium catalysts also are disclosed in still another aspect of this invention, and any silica composite and supported chromium catalyst disclosed herein can be characterized by a bulk density in a range from about 0.08 to about 0.4 g/mL, a total pore volume from about 0.4 to about 2.5 mL/g, a BET surface area from about 175 to about 375 $m^2/g$, and a peak pore diameter from about 10 to about 80 nm. Often, the silica composite and the supported chromium catalyst can have a peak pore diameter that falls within a range from about 15 to about 60 nm, from about 15 to about 50 nm, or from about 17 nm to about 40 nm. Further, the silica composite and the supported chromium catalyst can have a total pore volume in pores with diameters of less than or equal to 5 nm of less than or equal to about 25%, or less than or equal to about 20%, such as from about 2 to about 15%, and/or the silica composite and the supported chromium catalyst can have a total pore volume in pores with diameters of less than or equal to 3 nm of less than or equal to about 8%, less than or equal to about 6%, or less than or equal to about 4%. Additionally or alternatively, the silica composite and the supported chromium catalyst can have a total pore volume in pores with diameters in the 30-100 nm range of from about 0.5 to about 40%, such as from about 1 to about 35%, or from about 2 to about 35%.

The present invention also contemplates and encompasses olefin polymerization processes. Such processes can comprise contacting an (activated) supported chromium catalyst and an optional co-catalyst with an olefin monomer and optionally an olefin comonomer in a polymerization reactor system under polymerization conditions to produce an olefin polymer.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
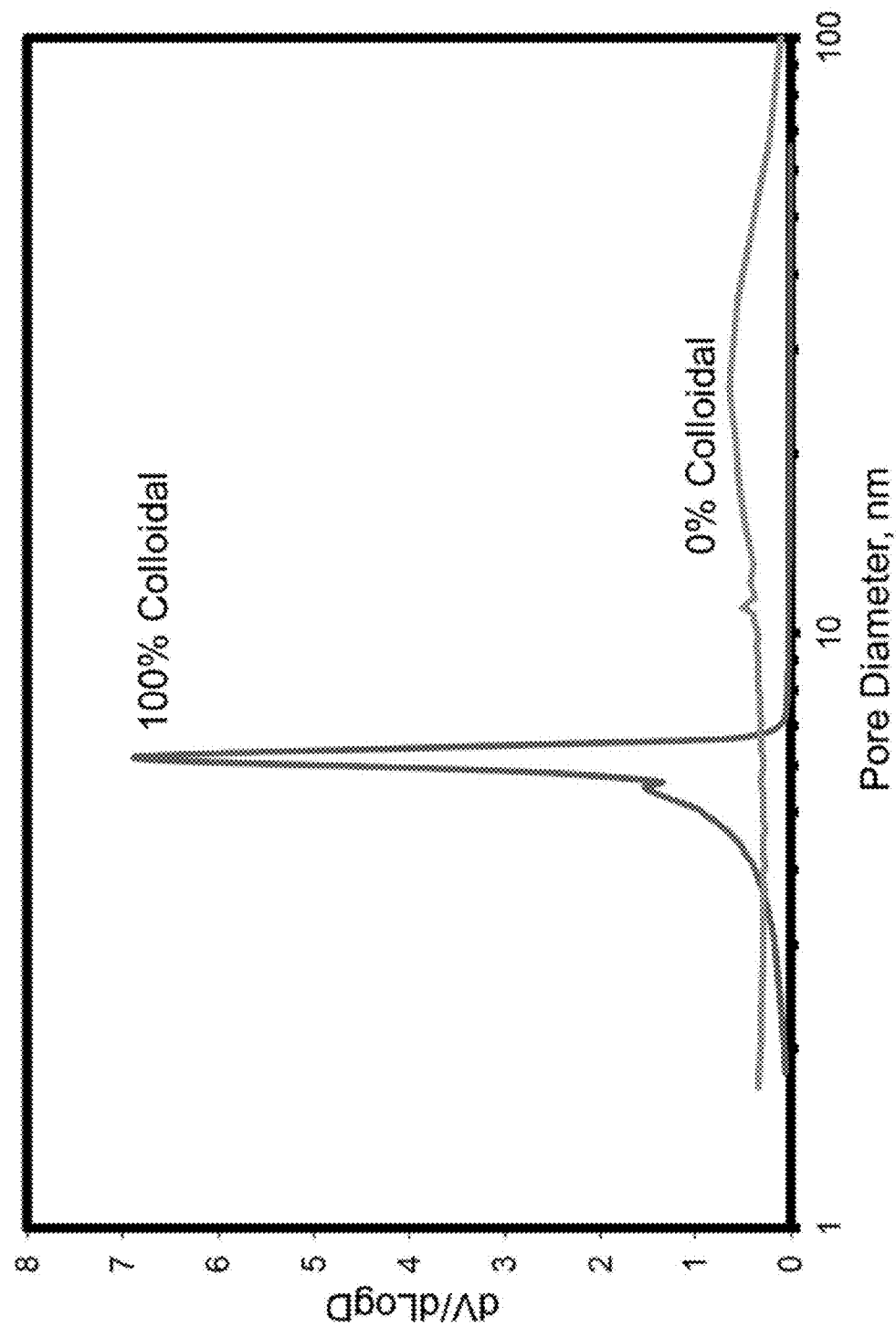
FIGS. 1-7 present plots of the pore volume distributions as a function of pore diameter (nm) for the colloidal silica, the fumed silica, and the silica composites prepared from the colloidal silica and the fumed silica, of Example 1.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the compounds, compositions, processes, or methods described herein are contemplated with or without explicit description of the particular combination. Additionally, unless explicitly recited otherwise, any aspect or feature disclosed herein can be combined to describe inventive compounds, compositions, processes, or methods consistent with the present disclosure.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The terms "contacting" and "combining" are used herein to describe compositions, processes, and methods in which the materials or components are contacted or combined together in any order, in any manner, and for any length of time, unless otherwise specified. For example, the materials or components can be blended, mixed, slurried, dissolved, reacted, treated, compounded, or otherwise contacted or combined in some other manner or by any suitable method or technique.

In this disclosure, while compositions (e.g., composites), processes, and methods are described in terms of "comprising" various components or steps, the compositions (e.g., composites), processes, and methods also can "consist essentially of" or "consist of" the various components or steps, unless stated otherwise.

The terms "a," "an," and "the" are intended to include plural alternatives, e.g., at least one. For instance, the disclosure of "a colloidal silica," "a chromium-containing compound," etc., is meant to encompass one, or mixtures or combinations of more than one, colloidal silica, chromium-containing compound, etc., unless otherwise specified.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers, and is inclusive of lower molecular weight polymers or oligomers.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst or the supported catalyst after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

A "water-soluble" material is meant to indicate that the material is dissolved in water at standard temperature (25° C.) and pressure (1 atm); in this regard, there is no visual precipitation of the material in water. Likewise, a "solution" is meant to indicate that there is no visual precipitate at standard temperature and pressure.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that a silica composite (or supported catalyst) consistent with aspects of this invention can have a total pore volume in a range from about 0.5 to about 3.5 mL/g. By a disclosure that the total pore volume can be in a range from about 0.5 to about 3.5 mL/g, the intent is to recite that the pore volume can be any pore volume in the range and, for example, can be equal to about 0.5, about 1, about 1.5, about 2, about 2.5, about 3, or about 3.5 mL/g. Additionally, the total pore volume can be within any range from about 0.5 to about 3.5 mL/g (e.g., from about 0.7 to about 2.5 mL/g), and this also includes any combination of ranges between about 0.5 and about 3.5 mL/g (e.g., the pore volume can be in a range from about 0.5 to about 1 mL/g, or from about 2 to about 3 mL/g). Further, in all instances, where "about" a particular value is disclosed, then that value itself is disclosed. Thus, the disclosure that the total pore volume can be from about 0.5 to about 3.5 mL/g also discloses a total pore volume from 0.5 to 3.5 mL/g (e.g., from 0.7 to 2.5 mL/g), and this also includes any combination of ranges between 0.5 and 3.5 mL/g (e.g., the pore volume can be in a range from 0.5 to 1 mL/g, or from 2 to 3 mL/g). Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 5% of the reported numerical value.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

Disclosed herein are processes for preparing silica composites and supported chromium catalysts. In these processes, a "framework" or "scaffold" silica generally characterized by irregular and non-spherical silica particles (e.g., a fumed silica) is combined with a "glue" silica (e.g., a colloidal silica) to form a composite (or aggregate) silica structure will high surface area and large diameter pores. Surprisingly, the individual silica components are generally not suitable by themselves for use in supported polymerization catalysts, however, by combining the components as described herein, excellent supported catalysts are produced, despite having relatively low total pore volumes and surface areas. Further, the silica composites and supported chromium catalysts can be synthesized in water-based systems, thereby reducing volatile organic compounds and emissions.

Beneficially, large pore diameter catalysts can improve melt index potential, enabling the production of higher melt index polymers, and with increased catalytic activity and reduced levels of long chain branching in the polymer.

Processes for Forming Silica Composites

Aspects of this invention are directed to processes for preparing a silica composite (or silica composition). A first process can comprise (or consist essentially of, or consist of) (1) combining silica component I and silica component II in a diluent comprising at least about 70 wt. % water to form a mixture, and (2) forming the (co-gelled) silica composite in the mixture. In the first process, silica component I can comprise irregular and non-spherical silica particles generally characterized by an average aspect ratio of at least about 2:1 and a BET surface area in a range from about 150 to about 1000 $m^2/g$, and silica component II can comprise a colloidal silica. A second process can comprise (or consist essentially of, or consist of) (1) combining silica component I and silica component II in a solvent to form a mixture, and (2) forming the (co-gelled) silica composite in the mixture. In the second process, silica component I can comprise irregular and non-spherical silica particles generally characterized by an average aspect ratio of at least about 2:1 and a BET surface area in a range from about 150 to about 1000 $m^2/g$, and silica component II can comprise a silicon compound (or silicon-containing compound). In the first and second processes, the resultant silica composite typically can be characterized by a bulk density in a range from about 0.08 to about 0.4 g/mL, a total pore volume from about 0.4 to about 2.5 mL/g, a BET surface area from about 175 to about 375 $m^2/g$, and a peak pore diameter from about 10 to about 80 nm, among other features disclosed herein.

Generally, the features of the first process and the second process (e.g., the features and characteristics of silica component I, the features and characteristics of silica component II, the conditions under which the silica composite is formed, and the features and characteristics of the silica composite, among others) are independently described herein and these features can be combined in any combination to further describe the disclosed processes to produce a silica composite. Moreover, additional process steps can be performed before, during, and/or after any of the steps in any of the processes disclosed herein, and can be utilized without limitation and in any combination to further describe these processes, unless stated otherwise. Further, any silica composites produced in accordance with the disclosed processes are within the scope of this disclosure and are encompassed herein. Moreover, silica composites (or compositions) characterized by a bulk density in a range from about 0.08 to about 0.4 g/mL, a total pore volume from about 0.4 to about 2.5 mL/g, a BET surface area from about 175 to about 375 $m^2/g$, and a peak pore diameter from about 10 to about 80 nm, are encompassed herein, regardless of their method of preparation.

Referring now to the first process for preparing a silica composite, this process can comprise (1) combining silica component I and silica component II in a diluent comprising at least about 70 wt. % water to form a mixture, and (2) forming the (co-gelled) silica composite in the mixture. Silica component I can comprise irregular and non-spherical silica particles characterized by an average aspect ratio of at least about 2:1 and a BET surface area in a range from about 150 to about 1000 $m^2/g$, and silica component II can comprise a colloidal silica. Unlike typical spherical silica particles, silica component I generally comprises irregular and non-spherical silica particles. The particles can be described as irregular, plate-like, or non-spherical, as well as other shapes/morphologies. Representative silica materials that can be used as silica component I can include fumed silicas (pyrogenic silicas), diatomaceous earth materials, silica-rich clays (e.g., montmorillonite), and the like, as well as combinations thereof. In some aspects of this invention, silica component I can be non-porous.

The BET surface area of silica component I is not particular limited, and often ranges from about 150 to about 1000 $m^2/g$. For instance, the BET surface area can be from about 150 to about 600 $m^2/g$ or, alternatively, from about 200 to about 500 $m^2/g$. Likewise, the average aspect ratio of silica component I is not particularly limited, but often is at least about 2:1. More often, the average aspect ratio of silica component I is at least about 3:1, at least about 5:1, or at least about 10:1. Average aspect ratio ranges for silica component I include from about 2:1 to about 50:1, from about 3:1 to about 50:1, and from about 5:1 to about 50:1. The aspect ratio is referred to herein as the longest (measurable) particle dimension divided by the shortest dimension. Optionally, silica component I can be further characterized by a d50 average particle size that can fall within a range from about 5 to about 500 nm, or from about 10 to about 300 nm.

In particular aspects of this invention, silica component I can comprise a fumed silica, and suitable grades are commercially available under the designations of Cab-o-sil® fumed silica, Aerosil® fumed silica, and the like. Combinations of more than one fumed silica, regardless of supplier, can be used as silica component I.

In the first process, silica component II can comprise a colloidal silica, and suitable grades are commercially available under the designations of Ludox® colloidal silica, Nyacol® colloidal silica, Levisil colloidal silica, and the like. Combinations of more than one colloidal silica, regardless of supplier, can be used as silica component II. Colloidal silicas are generally supplied as solids in a liquid. Any suitable % solids can be used.

Typically, the colloidal silica is substantially spherical in shape, in contrast to silica component I. Average aspect ratios for the colloidal silica are generally less than 1.8:1, less than 1.5:1, or less than 1.25:1, but are not limited thereto. Average particles sizes (d50) of the colloidal silica are relatively small, and often range from about 3 to about 25 nm, from about 3 to about 18 nm, or from about 4 to about 15 nm. Illustrative and non-limiting ranges for the BET surface area of the colloidal silica can include from about 200 to about 1000 $m^2/g$, from about 225 to about 500 $m^2/g$, and from about 250 to about 450 $m^2/g$.

The relative amounts of silica component I and silica component II in the first process are not particularly limited, so long as the amount of silica component II (the glue component) is sufficient to form a suitable silica composite. Thus, silica component II is typically used in lesser amounts relative to silica component I. The amount of silica component II, based on total amount of silica component I and silica component II, can be in a range from about 1 to about 35 wt. %; alternatively, from about 2 to about 25 wt. %; alternatively, from about 5 to about 30 wt. %; or alternatively, from about 3 to about 20 wt. %. For the colloidal silica, the amount of water is excluded from this calculation.

In step (1) of the first process, silica component I and silica component II can be contacted or combined in a diluent containing at least 70 wt. % water to form a mixture. It can be beneficial to use a diluent that is substantially all water, or at least about 80 wt. %, at least about 90 wt. %, at least about 95 wt. % water. Silica component I, silica component II, and the diluent can be contacted or combined in any order or sequence.

Referring now to step (2), in which the silica composite is formed in the mixture, or the co-gelled silica composite is formed in the mixture. The forming or co-gelling of the silica composite can be accomplished using a variety of techniques, such as adjusting the pH of the mixture (e.g., adding acid or base), removing water from and/or heating the mixture, adding a metal ion to the mixture (e.g., Al, Fe, Cr), adding an organic solvent (e.g., an alcohol) to the mixture, storing the mixture for a suitable period of time, and the like, as well as any combination of these techniques. For example, combining the silica components in step (1) to form the mixture can spontaneously result in formation of the silica composite, and thus step (1) and step (2) can occur substantially contemporaneously. As another example, adding alcohol to the mixture (or adding the mixture to alcohol) can result in formation of the silica composite. As yet another example, changing the pH of the mixture via acid (or base) addition can result in formation of the silica composite. Other suitable techniques for forming or co-gelling silica materials are known in the art, and likewise are encompassed herein.

Referring now to the second process for preparing a silica composite, this process can comprise (1) combining silica component I and silica component II in a solvent to form a mixture, and (2) forming the (co-gelled) silica composite in the mixture. In the second process, silica component I can comprise irregular and non-spherical silica particles as described herein, and thus silica component I can comprise any suitable fumed silica, such as Cab-o-sil® fumed silica, Aerosil® fumed silica, and the like, as well as combinations thereof. In the second process, silica component II can comprise a silicon compound (or silicon-containing compound).

The specific silicon compound used in as silicon component II is not particularly limited. Representative and non-limiting examples of suitable silicon compounds can include a silicon alkoxide (e.g., tetraethyl orthosilicate), a silicon halide, a silicon hydride, a silane, a hydrocarbyl silane, a siloxane, and the like, as well as combinations thereof. In one aspect, for example, the silicon compound can comprise sodium silicate, an ethyl silicate, a silicate oligomer (e.g., an ethyl silicate oligomer), as well as any combination thereof, while in another aspect, the silicon compound can comprise a Silbond® silicate.

Likewise, any suitable solvent can be used in the second process, but often the solvent is miscible with both oil and water. Representative and non-limiting examples of suitable solvents can include a ketone (e.g., acetone), an alcohol (e.g., methanol, ethanol, n-propanol, isopropanol, n-butanol, etc.), a glycol, an ester, an ether, acetonitrile, and the like. Additionally, combinations of two or more solvents can be used. The solvent also can further contain water, such that the solvent used can be, for instance, a mixture of alcohol and water.

The relative amounts of silica component I and silica component II in the second process are not particularly limited, so long as the amount of silica component II (the glue component) is sufficient to form a suitable silica composite. The amount of silica component II, based on total amount of silica component I and silica component II, can be in a range from about 10 to about 90 wt. %; alternatively, from about 15 to about 60 wt. %; alternatively, from about 20 to about 80 wt. %; or alternatively, from about 20 to about 50 wt. %.

Referring now to step (2), in which the silica composite is formed in the mixture, or the co-gelled silica composite is formed in the mixture. The forming or co-gelling of the silica composite can be accomplished using a variety of techniques as described herein for the first process, and any of these techniques are equally applicable to the second process.

Steps (1) and (2) of the first and second processes can be conducted at any suitable temperature and for any suitable period of time. Representative and non-limiting ranges for the temperature can include from about 5° C. to about 80° C., from about 15° C. to about 60° C., from about 10° C. to about 40° C., or from about 20° C. to about 50° C. These temperature ranges also are meant to encompass circumstances where the respective step is performed at a series of different temperatures, instead of at a single fixed temperature, falling within the respective temperature ranges.

Similarly, the time period for the respective step is not particularly limited, and can be conducted for any suitable period of time. In some aspects, the time period can be least about 1 minute, at least about 5 minutes, at least about 10 minutes, at least about 15 minutes, or at least about 30 minutes. In other aspects, the time period can be from about 30 seconds to about 48 hours, from about 1 minute to about 24 hours, from about 5 minutes to about 8 hours, from about 15 minutes to about 8 hours, or from about 5 minutes to about 2 hours.

The first process and the second process can include a step of drying the silica composite; alternatively, a step of calcining the silica composite; or alternatively, a step of drying the silica composite and a step of calcining the silica composite. Any method or technique for drying can be used, such as drying at elevated temperature and sub-atmospheric pressures, spray drying, and the like. Typical peak calcining temperatures often fall within a range from about 200° C. to about 800° C., such as from about 250° C. to about 600° C., from about 300° C. to about 600° C., or from about 300° C. to about 500° C. In these and other aspects, these temperature ranges also are meant to encompass circumstances where the calcination step is conducted at a series of different temperatures (e.g., an initial calcination temperature, a peak calcination temperature), instead of at a single fixed temperature, falling within the respective ranges.

The duration of the calcining step is not limited to any particular period of time. Hence, the calcining step can be conducted, for example, in a time period ranging from as little as 30-45 minutes to as long as 36-48 hours, or more. The appropriate calcining time can depend upon, for example, the initial/peak calcining temperature, among other variables. Generally, however, the calcining step can be conducted in a time period that can range from about 30 minutes to about 48 hours, such as, for example, from about 1 hour to about 24 hours, from about 1 hour to about 12 hours, from about 2 hours to about 12 hours, or from about 2 hours to about 8 hours.

The calcining step can be conducted in a calcining gas stream that comprises (or consists essentially of, or consists of) an inert gas (e.g., nitrogen), oxygen, air, or any mixture or combination thereof. In some aspects, the calcining gas stream can comprise air, while in other aspects, the calcining gas stream can comprise a mixture of air and nitrogen. Yet, in certain aspects, the calcining gas stream can be an inert gas, such as nitrogen and/or argon.

The calcining step can be conducted using any suitable technique and equipment, whether batch or continuous. For instance, the calcining step can be performed in a belt calciner or, alternatively, a rotary calciner. In some aspects, the calcining step can be performed in a batch or continuous calcination vessel comprising a fluidized bed. As would be recognized by those of skill in the art, other suitable techniques and equipment can be employed for the calcining step, and such techniques and equipment are encompassed herein.

Optionally, a titanium-containing compound can be contacted or combined—in any order—with silica component I and silica component II in the diluent or solvent in step (1) of the first process and the second process, for example, to prepare the silica composite (e.g., a "titanated" silica composite). The specific titanium-containing compound used is not particularly limited. Consistent with certain aspects of this invention, the titanium compound can be a Ti (III) compound and/or a Ti (IV) compound. Representative and non-limiting examples of suitable titanium-containing compounds can include a titanium alkoxide (e.g., titanium isopropoxide, titanium n-propoxide), a titanium halide, a titanium halide or oxohalide, a titanium acetylacetonate complex, a triethanolamine titanium complex, a titanium carboxylate (e.g., oxalate, citrate, lactate, etc.), and the like, as well as chelated or modified versions thereof for better suitability in water-based systems. Combinations of more than one titanium-containing compound can be used in the first process and the second process.

Processes for Forming Supported Chromium Catalysts

Aspects of this invention also are directed to processes for preparing supported chromium catalysts. In the processes for producing a silica composite described hereinabove, chromium addition can be incorporated in the respective processes. In an aspect, for example, a third process consistent with this invention can comprise (1) combining (in any order) a chromium-containing compound and an optional titanium-containing compound with silica component I and silica component II in the diluent or solvent to form a mixture, and (2) forming the supported chromium compound in the mixture. In this third process, silica component I, silica component II, the diluent, the solvent, and any process conditions can be the same as those described hereinabove for the first process and the second process. The components in the combining step can be contacted or combined by any suitable means, such as by mixing or slurrying the components. While not required, it can be beneficial for the chromium-containing compound (and the titanium-containing compound, if used) to be soluble in the diluent or solvent. Any suitable temperatures and time periods can be used in the third process, such as those disclosed hereinabove for the first process and second process. Optionally, the third process can further comprise a step of drying the supported chromium catalyst, a step of calcining the supported chromium catalyst, or both drying and calcining the supported chromium catalyst.

A fourth process for preparing a supported chromium catalyst in accordance with this invention can comprise using the silica composite described hereinabove—such as produced by performing step (1) and (2) in the first process or the second process—and (3) combining (in any order) a chromium-containing compound and an optional titanium-containing compound with the silica composite to form the supported chromium catalyst. The components in step (3) can be contacted or combined by any suitable means, such as by mixing or slurrying the components. While not required, it can be beneficial for the chromium-containing compound (and the titanium-containing compound, if used) to be soluble in any liquid medium that is present while conducting step (3). Any suitable temperatures and time periods can be used in the fourth process, such as those disclosed hereinabove for the first process and second process. Optionally, the fourth process can further comprise a step of drying the supported chromium catalyst, a step of calcining the supported chromium catalyst, or both drying and calcining the supported chromium catalyst.

A fifth process for preparing a supported chromium catalyst in accordance with this invention can comprise using the silica composite described hereinabove—such as produced by performing step (1) and (2) in the first process or the second process—and (3) combining (in any order) a chromium-containing compound and an optional titanium-containing compound with the silica composite while calcining to form the supported chromium catalyst. In the fifth process, chromium is incorporated onto the catalyst during the calcination step to form an activated supported chromium catalyst. Representative and non-limiting examples of the chromium-containing compound include chromium (III) acetate, basic chromium (III) acetate, chromium (III) acetylacetonate, $Cr_2(SO_4)_3$, $Cr(NO_3)_3$, and $CrO_3$, as well as combinations thereof.

In the third, fourth, and fifth processes, the resultant supported chromium catalyst generally can be characterized by a bulk density in a range from about 0.08 to about 0.4 g/mL, a total pore volume from about 0.4 to about 2.5 mL/g, a BET surface area from about 175 to about 375 $m^2/g$, and a peak pore diameter from about 10 to about 80 nm, among other features disclosed herein.

Generally, the features of the third, fourth, and fifth processes (e.g., the features and characteristics of silica component I, the features and characteristics of silica component II, the conditions under which the supported catalyst is formed, the chromium-containing compound, the titanium-containing compound (if used), and the features and characteristics of the supported chromium catalyst, among others) are independently described herein and these features can be combined in any combination to further describe the disclosed processes to produce a supported chromium catalyst. Moreover, additional process steps can be performed before, during, and/or after any of the steps in any of the processes disclosed herein, and can be utilized without limitation and in any combination to further describe these processes, unless stated otherwise. Further, any supported chromium catalysts (e.g., chromium/silica, or chromium/silica-titania when titanium is used) produced in accordance with the disclosed processes are within the scope of this disclosure and are encompassed herein.

Moreover, supported chromium catalysts (with or without titanium) characterized by a bulk density in a range from about 0.08 to about 0.4 g/mL, a total pore volume from about 0.4 to about 2.5 mL/g, a BET surface area from about 175 to about 375 $m^2/g$, and a peak pore diameter from about 10 to about 80 nm, and containing a silica composite and generally from about 0.1 to about 15 wt. % chromium are encompassed herein, regardless of their method of preparation. Thus, consistent with aspects of this invention, the amount of the silica composite in the supported catalyst generally can range from about 85 to about 99.9 wt. %; alternatively, from about 92 to about 99 wt. %; alternatively, from about 93 to about 98 wt. %; or alternatively, from about 94 to about 99 wt. % silica composite. These weight percentages are based on the weight of the silica composite relative to the total weight of the catalyst. The supported chromium catalyst encompasses pre-catalysts or pre-calcined catalysts (prior to calcination) as well as activated catalysts or calcined catalysts (after calcination).

Any suitable chromium-containing compound (or chromium precursor) can be used to form the supported chromium catalyst. Illustrative and non-limiting examples of chromium (II) compounds can include chromium (II) acetate, chromium (II) chloride, chromium (II) bromide, chromium (II) iodide, chromium (II) sulfate, and the like, as well as combinations thereof. Likewise, illustrative and non-limiting examples of chromium (III) compounds can include a chromium (III) carboxylate, a chromium (III) naphthenate, a chromium (III) halide, chromium (III) sulfate, chromium (III) nitrate, a chromium (III) dionate, and the like, as well as combinations thereof. In some aspects, the chromium-containing compound can comprise chromium (III) acetate, chromium (III) acetylacetonate, chromium (III) chloride, chromium (III) bromide, chromium (III) sulfate, chromium (III) nitrate, and the like, as well combinations thereof.

If used, any suitable titanium-containing compound can be used, such as a titanium alkoxide (e.g., titanium isopropoxide, titanium n-propoxide), a titanium halide, a titanium halide or oxohalide, a titanium acetylacetonate complex, a triethanolamine titanium complex, a titanium carboxylate (e.g., oxalate, citrate, lactate, etc.), and the like, as well as chelated or modified versions thereof for better suitability in water-based systems. Combinations of more than one titanium-containing compound can be used in the third, fourth, and fifth processes. The supported chromium catalyst produced using a titanium-containing compound often can be referred to as a titanated chromium catalyst (e.g., chromium/silica-titania).

In various aspects encompassed herein, a calcining step is used (often referred to as an activation step). As it pertains to calcining (or activating) the supported chromium catalyst, the calcination process can be conducted at a variety of temperatures and time periods, which are generally selected to convert all or a portion of the chromium to hexavalent chromium. Often, such is performed in an oxidizing atmosphere, but this is not a requirement. For instance, the calcining step can be conducted at a peak temperature in a range from about 400° C. to about 1000° C.; alternatively, from about 500° C. to about 900° C.; from about 500° C. to about 900° C.; alternatively, from about 600° C. to about 871° C.; alternatively, from about 550° C. to about 850° C.; alternatively, from about 700° C. to about 850° C.; alternatively, from about 725° C. to about 900° C.; alternatively, from about 725° C. to about 871° C.; alternatively, from about 725° C. to about 850° C.; alternatively, from about 750° C. to about 871° C.; or alternatively, from about 750° C. to about 850° C. In these and other aspects, these temperature ranges also are meant to encompass circumstances where the calcining step is conducted at a series of different temperatures (e.g., an initial temperature, a peak temperature), instead of at a single fixed temperature, falling within the respective ranges. For instance, the calcining step can start at an initial temperature, and subsequently, the temperature can be increased to the peak temperature, for example, a peak temperature in a range from about 550° C. to about 850° C., or from about 725° C. to about 900° C.

The duration of the calcining step is not limited to any particular period of time. Hence, this calcining step can be conducted, for example, in a time period ranging from as little as 1 minute to as long as 12-24 hours, or more. The appropriate calcining time can depend upon, for example, the initial/peak temperature, among other variables. Generally, however, the calcining step can be conducted in a time period that can be in a range from about 1 minute to about 24 hours, such as, for example, from about 30 minutes to about 8 hours, from about 1 hour to about 12 hours, from about 2 hours to about 12 hours, from about 3 hours to about 10 hours, or from about 5 hours to about 10 hours.

When used, the amount of titanium in the supported chromium catalysts (or silica composites such as silica-titania) disclosed herein is not particularly limited. Generally, however, the amount of titanium in the supported chromium catalyst (or silica composite) can range from about 0.1 to about 20 wt. %; alternatively, from about 0.5 to about 10 wt. %; alternatively, from about 1 to about 10 wt. %; alternatively, from about 1 to about 6 wt. %; or alternatively, from about 1.5 to about 5 wt. % titanium. These weight percentages are based on the amount of titanium relative to the total weight of the catalyst (or silica composite).

Likewise, the amount of chromium in the supported chromium catalysts (whether pre-calcined or calcined/activated) disclosed herein is not particularly limited. Generally, however, the amount of chromium in the supported catalyst can range from about 0.1 to about 20 wt. %; alternatively, from about 0.1 to about 15 wt. %; alternatively, from about 0.5 to about 15 wt. %; alternatively, from about 0.5 to about 5 wt. %; alternatively, from about 0.5 to about 2.5 wt. %; alternatively, from about 1 to about 10 wt. %; or alternatively, from about 1 to about 6 wt. %. These weight percentages are based on the amount of chromium relative to the total weight of the catalyst.

In one aspect, at least about 75 wt. %, at least about 80 wt. %, at least about 85 wt. %, at least about 90 wt. %, at least about 95 wt. %, or at least about 99 wt. %, of the chromium can be present in an oxidation state of three or less. In this aspect, the catalyst generally is pre-calcined, although typically dried. In another aspect, at least about 30 wt. %, at least about 40 wt. %, at least about 50 wt. %, at least about 60 wt. %, at least about 70 wt. %, at least about 80 wt. %, at least about 90 wt. %, or at least about 95 wt. %, of the chromium can be present as hexavalent chromium. In this aspect, the catalyst is calcined (or activated).

Referring now to the characteristics of the silica composites and supported chromium catalysts disclosed herein, such silica composites and supported chromium catalysts can be characterized by a bulk density from about 0.08 to about 0.4 g/mL, a total pore volume from about 0.4 to about 2.5 mL/g, a BET surface area from about 175 to about 375 m²/g, and a peak pore diameter from about 10 to about 80 nm. These illustrative and non-limiting examples of silica composites and supported chromium catalysts consistent with the present invention also can have any of the properties listed below and in any combination, unless indicated otherwise.

In an aspect, the silica composite and the supported chromium catalyst, independently, can have a bulk density in a range from about 0.08 to about 0.35 g/mL, from about 0.1 to about 0.35 g/mL, from about 0.1 to about 0.32 g/mL, from about 0.12 to about 0.34 g/mL, or from about 0.14 to about 0.37 g/mL. For comparison, the typical bulk density of fumed silicas is in the 0.04-0.05 g/mL range.

The total pore volume and BET surface area of suitable silica composites and supported chromium catalyst are not particularly limited. The total pore volume can range from about 0.5 to about 3.5 mL/g; alternatively, from about 0.4 to about 2.5 mL/g; alternatively, from about 0.4 to about 1.5 mL/g; alternatively, from about 0.5 to about 2 mL/g; or alternatively, from about 0.5 to about 1.3 mL/g. The BET surface area can range from about 175 to about 360 m²/g; alternatively, from about 190 to about 375 m²/g; alternatively, from about 200 to about 375 m²/g; or alternatively, from about 200 to about 360 m²/g.

Beneficially, the silica composite and supported chromium catalyst have a significant amount of meso-pores (pores with a pore size greater than or equal to 10 nm in diameter, and especially 30 nm or more). One test to quantify the significant amount of large pores is the peak pore diameter (location, in pore diameter, of the highest point of the pore size distribution curve). The silica composite and the supported chromium catalyst, independently, often have a peak pore diameter from about 10 to about 80 nm, such as from about 10 to about 70 nm, from about 10 to about 50 nm, or from about 10 to about 40 nm. In some aspects, the peak pore diameter can range from about 15 to about 60 nm, from about 15 to about 50 nm, from about 17 to about 40 nm, from about 20 to about 80 nm, from about 20 to about 50 nm, or from about 25 nm to about 60 nm.

Another indicator of the significant amount of large pores is the average pore diameter (4*PV/SA). For example, a silica composite with a total pore volume of 1.15 mL/g and a total BET surface area of 359 m²/g translates to an average pore diameter of 12.8 nm. The silica composite and the supported chromium catalyst, independently, can have an average pore diameter in a range from about 8 to about 70 nm, from about 9 to about 50 nm, from about 9 to about 30 nm, from about 10 to about 50 nm, or from about 10 to about 30 nm.

Another indicator of the significant amount of large pores is the percentage of the total pore volume in pores with diameters in the 10-50 nm range (or 10-100 nm range). The silica composite and the supported chromium catalyst, independently, can have at least about 35%, at least about 40%, from about 35 to about 95%, or from about 40 to about 85%, of the total pore volume in pores with diameters in the 10-50 nm range (or 10-100 nm range).

Another indicator of the significant amount of large pores is the percentage of the total pore volume in pores with diameters in the 30-100 nm range, i.e., at least 30 nm and up to 100 nm pore diameters. The silica composite and the supported chromium catalyst, independently, can have from about 0.5 to about 40%, from about 0.5 to about 35%, from about 1 to about 35%, or from about 2 to about 35%, of the total pore volume in pores with diameters in the 30-100 nm range.

Another indicator of the significant amount of large pores is the amount of pore volume present in pores with diameters in the 10-50 nm range (or 100-100 nm range). The silica composite and the supported chromium catalyst, independently, can have a pore volume of pores with diameters in the 10-50 nm range (or 10-100 nm range) of at least about 0.2 mL/g, at least about 0.3 mL/g, from about 0.2 to about 1.5 mL/g, or from about 0.4 to about 1.3 mL/g.

Yet another indicator of the significant amount of large pores is the percentage of total BET surface area in pores with diameters in the 10-50 nm range (or 10-100 nm range). The silica composite and the supported chromium catalyst, independently, can have at least about 15%, at least about 20%, from about 15 to about 65%, or from about 20 to about 60%, of the total surface area in pores with diameters in the 10-50 nm range (or 10-100 nm range).

Still another indicator of the significant amount of large pores is the amount of BET surface area present in pores with diameters in the 10-50 nm range (or 100-100 nm range). The silica composite and the supported chromium catalyst, independently, can have a surface area of pores with diameters in the 10-50 nm range (or 10-100 nm range) of at least about 40 $m^2/g$, at least about 50 $m^2/g$, from about 40 to about 200 $m^2/g$, or from about 60 to about 180 $m^2/g$.

Given the increased pore volume and surface area in large pores, there is less pore volume and surface area in micropores (less than 10 nm, and especially less than 5 nm or 3 nm). In one aspect, for instance, the silica composite and the supported chromium catalyst, independently, can have less than or equal to about 65%, less than or equal to about 60%, from about 5 to about 65%, or from about 15 to about 55%, of the total pore volume in pores with diameters of less than or equal to 10 nm. Additionally or alternatively, the silica composite and the supported chromium catalyst, independently, can have less than or equal to about 25%, less than or equal to about 20%, from about 1 to about 25%, or from about 2 to about 15%, of the total pore volume in pores with diameters of less than or equal to 5 nm. Additionally or alternatively, the silica composite and the supported chromium catalyst, independently, can have less than or equal to about 8%, less than or equal to about 7%, less than or equal to about 6%, or less than or equal to about 4%, of the total pore volume in pores with diameters of less than or equal to 3 nm.

Likewise, for surface area, the silica composite and the supported chromium catalyst, independently, can have less than or equal to about 50%, less than or equal to about 30%, from about 5 to about 50%, or from about 5 to about 30%, of the surface area in pores with diameters of less than or equal to 5 nm.

The silica composite (or supported chromium catalyst) can have any suitable particle size, as would be recognized by those of skill in the art. Illustrative and non-limiting ranges for the average (d50) particle size of the silica composite (or supported chromium catalyst) can include from about 10 to about 500 microns, from about 25 to about 250 microns, from about 40 to about 160 microns, or from about 40 to about 120 microns.

Polymerization Processes

Supported chromium catalysts of the present invention can be used to polymerize olefins to form homopolymers, copolymers, terpolymers, and the like. One such process for polymerizing olefins can comprise contacting any (activated) supported chromium catalyst disclosed herein (e.g., produced by any process disclosed herein) and an optional co-catalyst with an olefin monomer and an optional olefin comonomer in a polymerization reactor system under polymerization conditions to produce an olefin polymer.

The catalyst compositions and/or polymerization processes disclosed herein often can employ a co-catalyst. In some aspects, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth, and in which the metal can be any suitable metal, often a group 13 metal. Hence, the metal can be boron or aluminum in certain aspects of this invention, and the co-catalyst can comprise a boron hydrocarbyl or alkyl, or an aluminum hydrocarbyl or alkyl, as well as combinations thereof.

In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoaluminums include trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used in the catalyst compositions of this invention are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Unsaturated monomers that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal ($\alpha$), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent, based on the total weight of the monomer and comonomer. According to another aspect of the present invention, the amount of comonomer introduced into a polymerization reactor system can be from about 0.01 to about 40 weight percent comonomer, based on the total weight of the monomer and comonomer, or alternatively, from about 0.1 to about 35 weight percent comonomer, or from about 0.5 to about 20 weight percent comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

The supported chromium catalysts described herein have excellent catalytic activity and productivity. Typical productivities of the catalyst range from about 500 to about 5000 grams of polymer per gram of supported chromium catalyst (g/g), from about 800 to about 4000 g/g, or from about 1000 to about 3000 g/g, and the like.

The supported chromium catalysts of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. These reactor types generally can be operated continuously. Continuous processes can use intermittent or continuous polymer product discharge. Polymerization reactor systems and processes also can include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). For instance, the polymerization reactor system can comprise a solution reactor, a gas-phase reactor, a slurry reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor, e.g., comprising vertical or horizontal loops. Monomer, diluent, catalyst, and optional comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately in such high pressure polymerization reactors to obtain optimal polymerization reaction conditions.

According to yet another aspect, the polymerization reactor system can comprise a solution polymerization reactor, wherein the monomer/comonomer can be contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures (e.g., up to between 150° C. and 180° C.) and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

In some aspects, the polymerization reactor system can comprise any combination of a raw material feed system, a feed system for catalyst and/or catalyst components, and/or a polymer recovery system, including continuous systems. In other aspects, suitable reactor systems can comprise systems for feedstock purification, catalyst storage and preparation, extrusion, reactor cooling, polymer recovery, fractionation, recycle, storage, loadout, laboratory analysis, and process control.

Polymerization conditions that can be monitored, adjusted, and/or controlled for efficiency and to provide desired polymer properties can include, but are not limited to, reactor temperature, reactor pressure, catalyst system flow rate into the reactor, monomer flow rate (and comonomer, if employed) into the reactor, monomer concentration in the reactor, olefin polymer output rate, recycle rate, hydrogen flow rate (if employed), reactor cooling status, and the like. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, from about 60° C. to about 185° C., from about 60° C. to about 120° C., or from about 130° C. to about 180° C., depending upon the type of polymerization reactor, the polymer grade, and so forth. In some reactor systems, the polymerization reactor temperature generally can be within a range from about 70° C. to about 110° C., or from about 125° C. to about 175° C. Various polymerization conditions can be held substantially constant, for example, for the production of a particular grade of olefin polymer.

Suitable pressures will also vary according to the reactor and polymerization type. The pressure for liquid phase polymerizations in a loop reactor typically can be less than 1000 psig (6.9 MPa). The pressure for gas phase polymerization usually can be in the 200 psig to 500 psig range (1.4 MPa to 3.4 MPa). High pressure polymerization in tubular or autoclave reactors generally can be conducted at about 20,000 psig to 75,000 psig (138 MPa to 517 MPa). Polymerization reactors can also be operated in a supercritical region occurring at generally higher temperatures and pressures (for instance, above 92° C. and 700 psig (4.83 MPa)). Operation above the critical point of a pressure/temperature diagram (supercritical phase) can offer advantages to the polymerization reaction process.

Aspects of this invention also are directed to olefin polymerization processes conducted in the absence of added hydrogen. An olefin polymerization process of this invention can comprise contacting a supported chromium catalyst and an optional co-catalyst with an olefin monomer and optionally an olefin comonomer in a polymerization reactor system under polymerization conditions to produce an olefin polymer, and wherein the polymerization process is conducted in the absence of added hydrogen (no hydrogen is added to the polymerization reactor system). As one of ordinary skill in the art would recognize, hydrogen can be generated in-situ by certain catalyst systems in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a supported chromium catalyst and an optional co-catalyst with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The amount of hydrogen added (based on the amount of olefin monomer) to the process can be controlled at a molar percentage which generally falls within a range from about 0.05 to about 20 mole %, from about 0.1 to about 15 mole %, from about 0.25 to about 10 mole %, or from about 0.5 to about 10 mole %. In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio, and maintained at the ratio to within about +/−25% during the polymerization run. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

Ethylene polymers produced in accordance with this invention can have a high load melt index (HLMI) of less than or equal to about 100, less than or equal to about 75, or less than or equal to about 50 g/10 min. Suitable ranges for the HLMI can include, but are not limited to, from 0 to about 100, from about 1 to about 80, from about 1 to about 50, from about 1 to about 40, from about 1 to about 20, from about 2 to about 80, from about 2 to about 50, or from about 2 to about 40 g/10 min.

The densities of ethylene-based polymers produced using the supported chromium catalysts and the processes disclosed herein often are greater than or equal to about 0.89 g/cm$^3$. In one aspect of this invention, the density of the ethylene polymer can be in a range from about 0.90 to about 0.97 g/cm$^3$. Yet, in another aspect, the density can be in a range from about 0.91 to about 0.96 g/cm$^3$, such as, for example, from about 0.92 to about 0.96 g/cm$^3$, from about 0.93 to about 0.955 g/cm$^3$, or from about 0.94 to about 0.955 g/cm$^3$.

In an aspect, ethylene polymers described herein can have a ratio of Mw/Mn, or the polydispersity index, in a range from about 5 to about 40, from about 7 to about 25, or from about 8 to about 18. Additionally or alternatively, the ratio of Mz/Mw can range from about 5 to about 10, from about 5 to about 9, or from about 6 to about 8. While not being limited thereto, the ethylene polymer often has a Mw in a range from about 150 to about 500 kg/mol, from about 200 to about 400 kg/mol, or from about 180 to about 350 kg/mol.

In an aspect, ethylene polymers described herein can have a ratio of $I_{21}/I_{10}$ in a range from about 2 to about 12, from about 3 to about 12, from about 3 to about 10, from about 4 to about 10, or from about 4.5 to about 9. Additionally or alternatively, the CY-a parameter of the ethylene polymer can be in a range from about 0.1 to about 0.3, from about 0.12 to about 0.28, or from about 0.15 to about 0.25.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Also contemplated herein is a method for forming or preparing an article of manufacture comprising a polymer produced by any of the polymerization processes disclosed herein. For instance, a method can comprise (i) contacting a supported chromium catalyst (e.g., produced as described herein) and an optional co-catalyst with an olefin monomer and an optional olefin comonomer under polymerization conditions in a polymerization reactor system to produce an olefin polymer; and (ii) forming an article of manufacture comprising the olefin polymer (e.g., having any of the polymer properties disclosed herein). The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Melt index (MI, g/10 min) was determined in accordance with ASTM D1238 at 190° C. with a 2.16 kg weight, $I_{10}$ (g/10 min) was determined in accordance with ASTM D1238 at 190° C. with a 10 kg weight, and high load melt index (HLMI, I21, g/10 min) was determined in accordance with ASTM D1238 at 190° C. with a 21.6 kg weight.

The bulk density was determined in accordance with ASTM D1895 using a 100-mL graduated cylinder.

Molecular weights and molecular weight distributions were obtained from a Waters 150 CV Plus or a Polymer Labs PL220 Gel Permeation Chromatograph using trichlorobenzene as the solvent with a flow rate of 1 mL/min at a temperature of 140° C. BHT at a concentration of 0.5 g/L was used as a stabilizer in the solvent. An injection volume of 220 µL was used with a nominal polymer concentration of 6.5 mg/3.5 mL (at room temperature). The column set consisted of two Waters Styragel HT 6E mixed-bed or three or four PLGel Mixed A columns plus a guard column. A broad-standard integral method of universal calibration was used based on a Chevron Phillips Chemical Company HDPE polyethylene resin, MARLEX® BHB 5003, as the broad linear PE standard. Parameter values used in the Mark-Houwink equation ($[\eta]=K \cdot M^a$) for polyethylene were $K=39.5(10^{-3})$ mL/g and a=0.726. Mn is the number-average molecular weight, Mw is the weight-average molecular weight, and Mz is the z-average molecular weight.

Samples for viscosity measurements were compression molded at 182° C. for a total of three minutes. The samples were allowed to melt at a relatively low pressure for one minute and then subjected to a high molding pressure for an additional two minutes. The molded samples were then quenched in a cold (room temperature) press. Subsequently, 2 mm×25.4 mm diameter disks were stamped out of the molded slabs for rheological characterization. Fluff samples were stabilized with 0.1 wt. % BHT dispersed in acetone and then vacuum dried before molding.

Small-strain oscillatory shear measurements were performed at 190° C. on a Rheometrics Inc. RMS-800 or ARES rheometer using parallel-plate geometry over an angular frequency range of 0.03-100 rad/s. The test chamber of the rheometer was blanketed in nitrogen in order to minimize polymer degradation. The rheometer was preheated to the initial temperature of the study. Upon sample loading and after oven thermal equilibration, the specimens were squeezed between the plates to a 1.6 mm thickness and the excess was trimmed. A total of approximately 8 minutes elapsed between the time the sample was inserted between the plates and the time the frequency sweep was started.

Strains were generally maintained at a single value throughout a frequency sweep, but larger strain values were used for low viscosity samples to maintain a measurable torque. Smaller strain values were used for high viscosity samples to avoid overloading the torque transducer and to keep within the linear viscoelastic limits of the sample. The instrument automatically reduced the strain at high frequencies if necessary to keep from overloading the torque transducer. The complex viscosity $|\eta^*|$ versus frequency ($\omega$) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1+(\tau_\eta \omega)^a]^{(1-n)/a}},$$

wherein: $|\eta^*(\omega)|$=magnitude of complex shear viscosity;
$\eta_0$=zero shear viscosity;
$\tau_\eta$=viscous relaxation time (Tau($\eta$));
a="breadth" parameter (CY-a parameter);
n=fixes the final power law slope, fixed at 2/11; and
$\omega$=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety.

For silica composite and supported catalyst characterization, about 0.2 g of sample were degassed in a physisorption tube, using a Micromeritics SmartVacPrep. To prevent portions of the fine particles from boiling up to a region of the sample tube not in the heated zone, the pressure was reduced gradually, and the temperature was increased stepwise. The pressure was initially reduced from ambient to 5 mm Hg, at a controlled rate of 5 mm Hg/s, while holding the samples at 30° C. After reaching sufficient vacuum (~0.09 mm Hg), the temperature was increased to 50° C., then to 70° C., then to 90° C., with each temperature step held for 30 minutes. The last step held the temperature at 300° C. for 12 hours, with the final vacuum reaching a pressure of about 1 milliTorr. After cooling to ambient, the samples were backfilled with nitrogen and analyzed on a Micromeritics TriStar II nitrogen physisorption instrument. Approximately 64 adsorption points were collected to construct an isotherm, and software packages included with the instrument were used to determine surface areas, total pore volumes, and to generate pore size distribution curves. Surface areas were determined using the BET method (Brunauer, *J. Am Chem. Soc.*, 1938, 60, 309), from adsorption isotherm points having P/Po values from 0.0 to 0.2. Pore volume values were calculated from the isotherm point having a P/Po value closest to 0.982. Pore size distributions were generated from desorption isotherm data using the BJH method (*J. Am. Chem. Soc.*, 1951, 73, 373), with thickness curves generated using the Halsey equation (*J. Chem. Phys.*, 1948, 16, 931). These references are incorporated herein by reference in their entirety.

The absolute pore volumes and surface area data determined as a function of pore size were normalized to equal the overall total pore volume and overall BET surface area, which were determined by nitrogen sorption.

Example 1

Silica Composites Prepared from Fumed Silica and Colloidal Silica

A colloidal solution of silica was obtained from W.R. Grace under the trade name of Ludox® SM-AS. It contained ~25 wt. % of approximately 5 nm diameter colloidal silica particles, and forms a nominal 300 m²/g BET surface area silica when gelled and dried. The colloidal solution of silica was stabilized by the addition of small amounts of ammonium hydroxide, and therefore the solution when received was in the alkaline state. This colloidal solution was used as silica component II (a "glue" component) to produce a series of silica composites.

Figure 2:
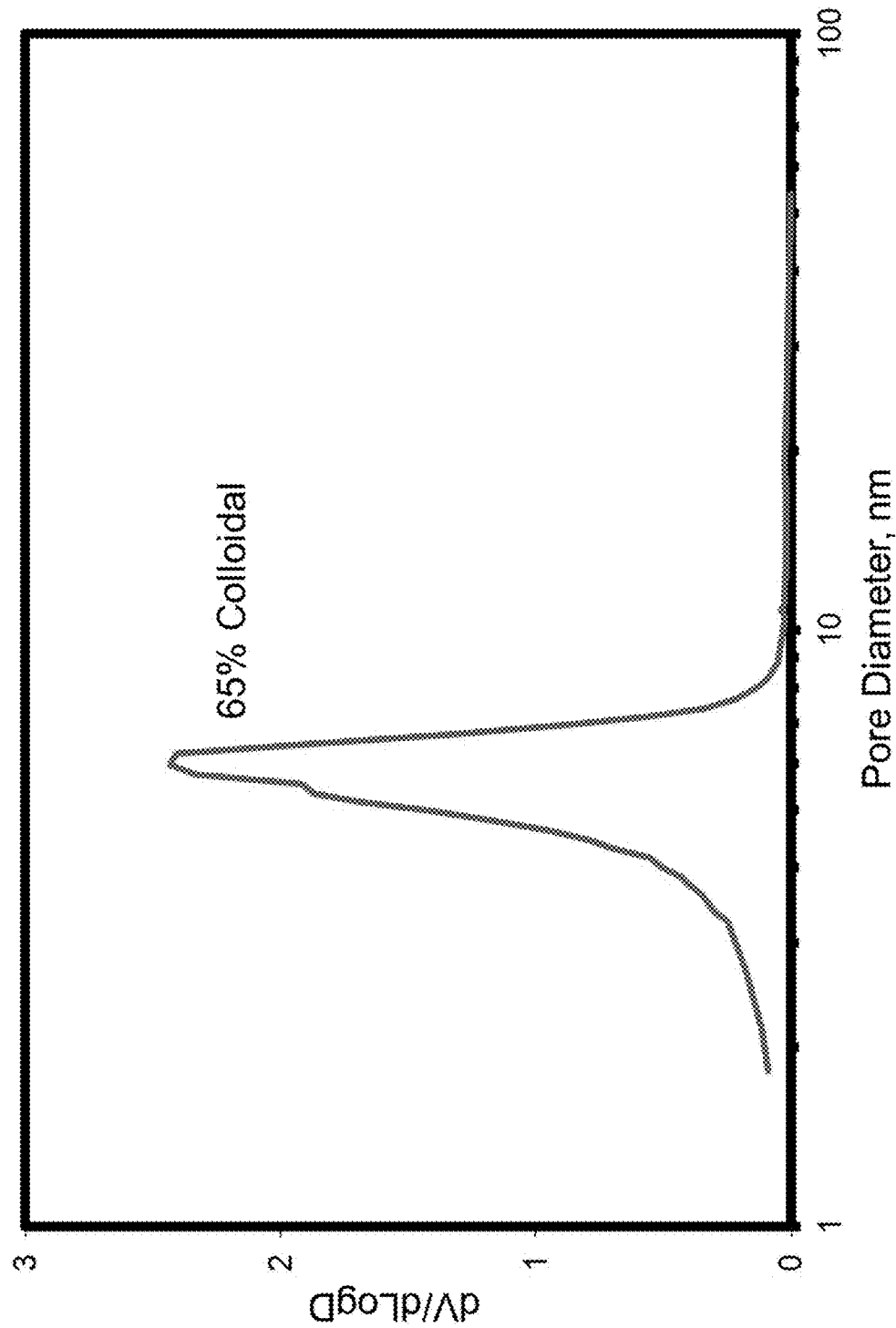
Figure 3:
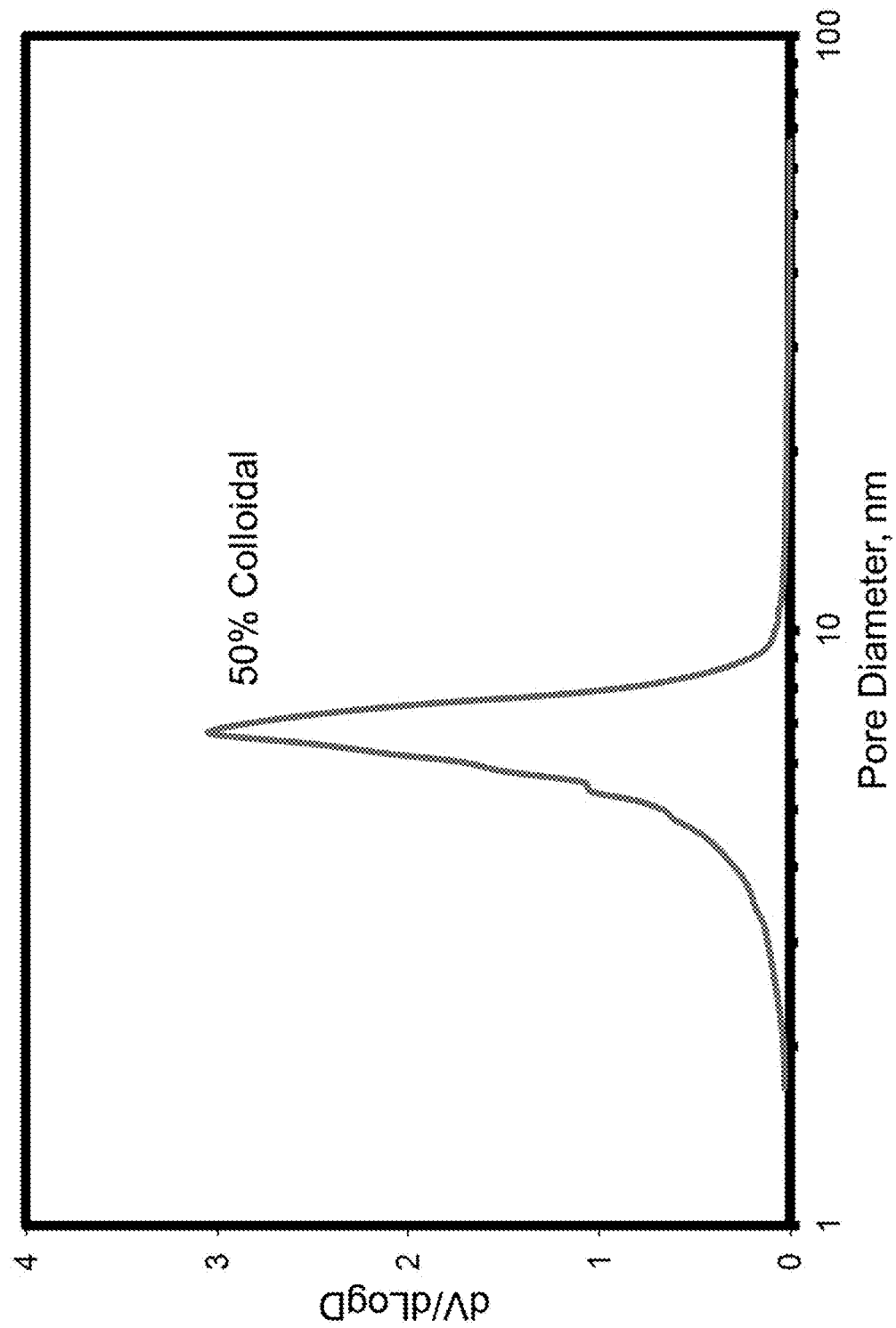
Figure 4:
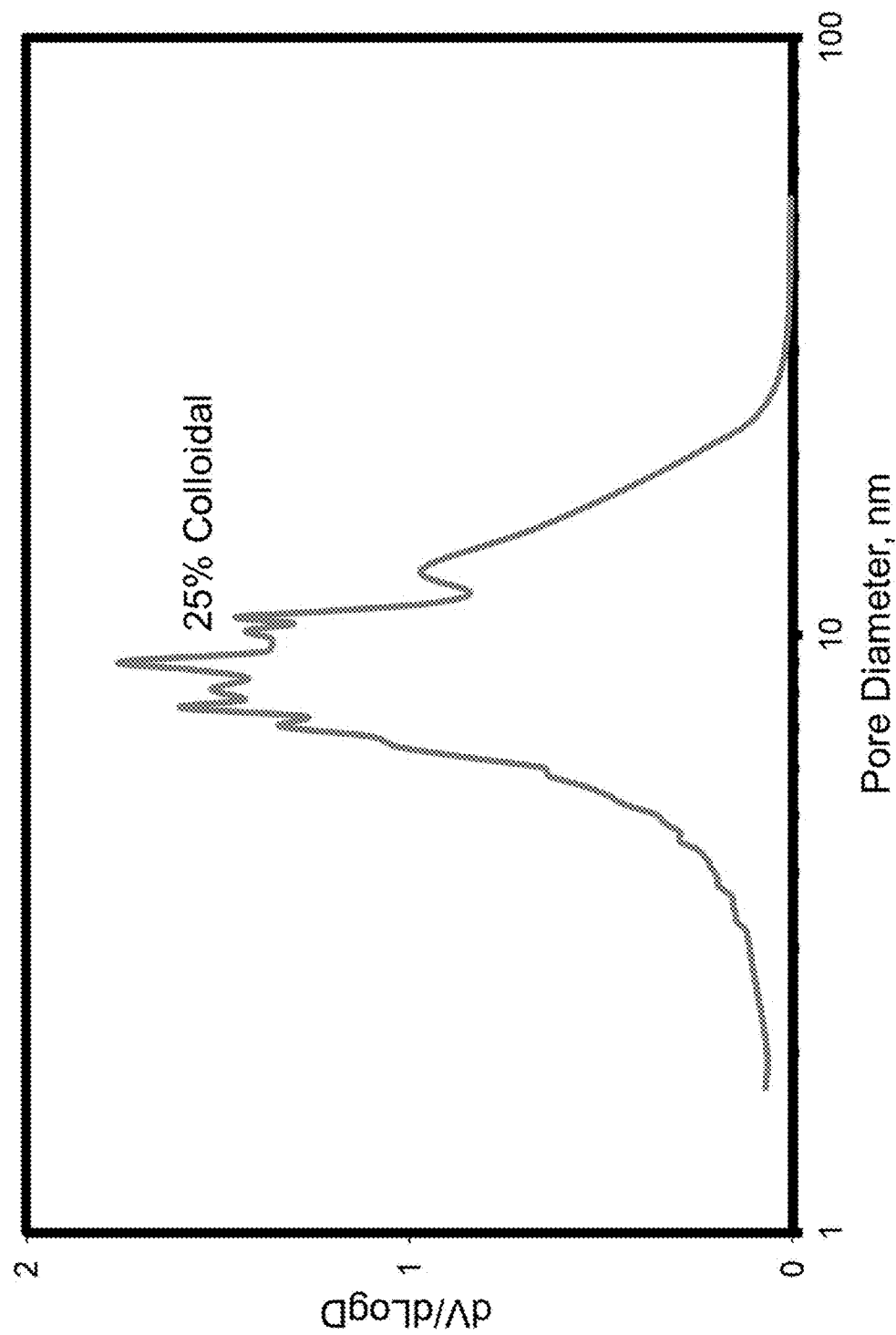
Figure 5:
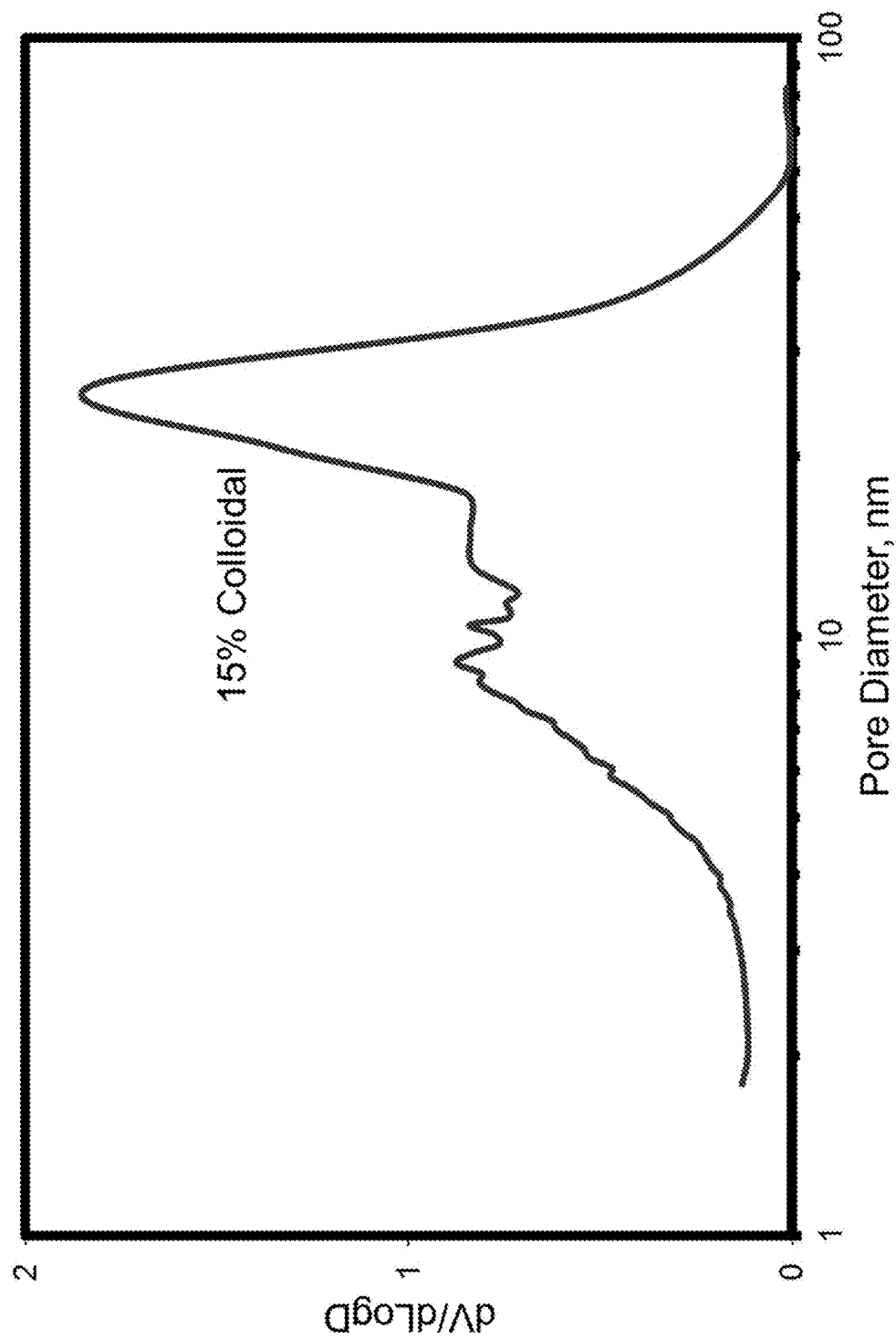
Figure 6:
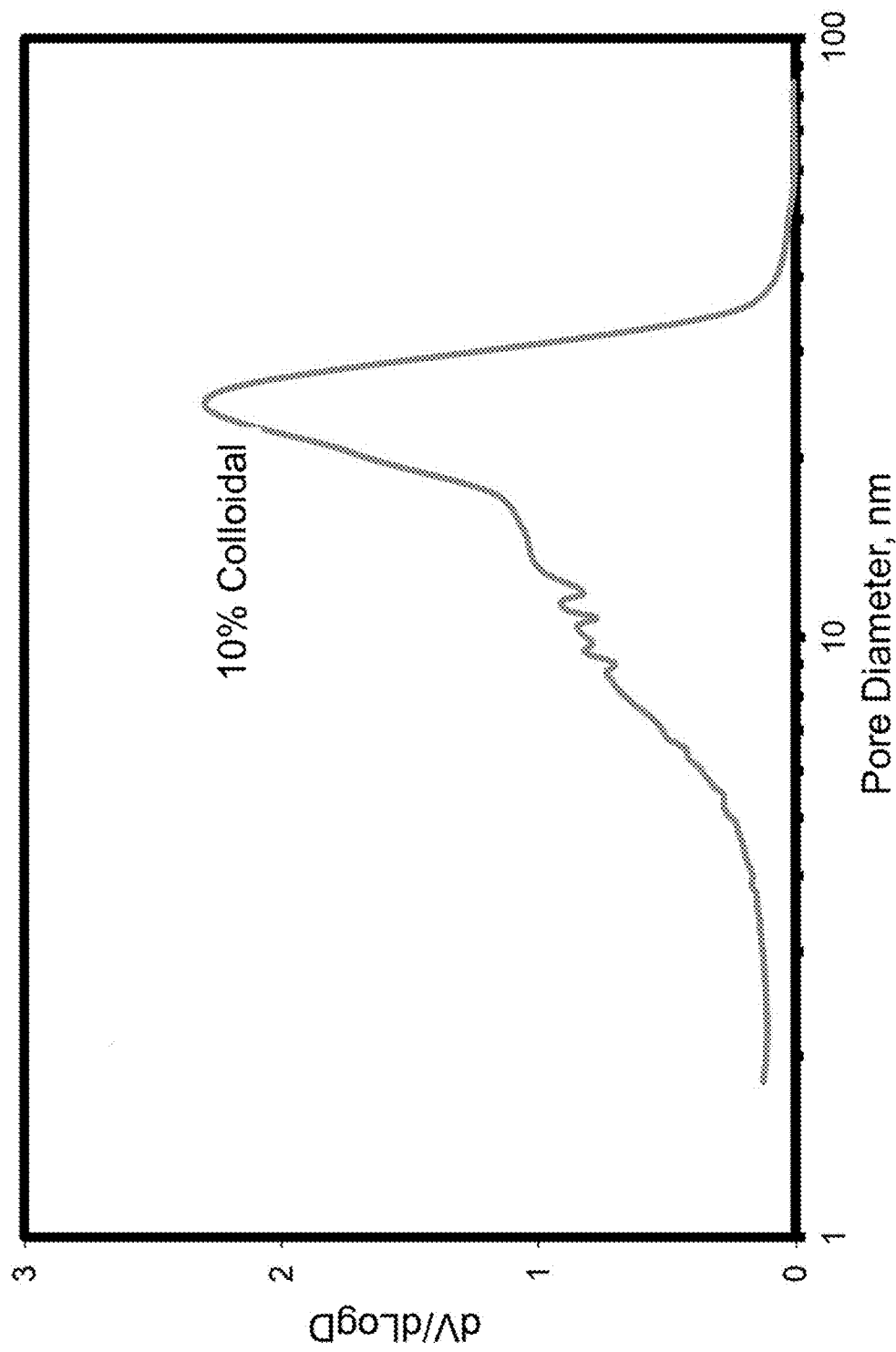
Figure 7:
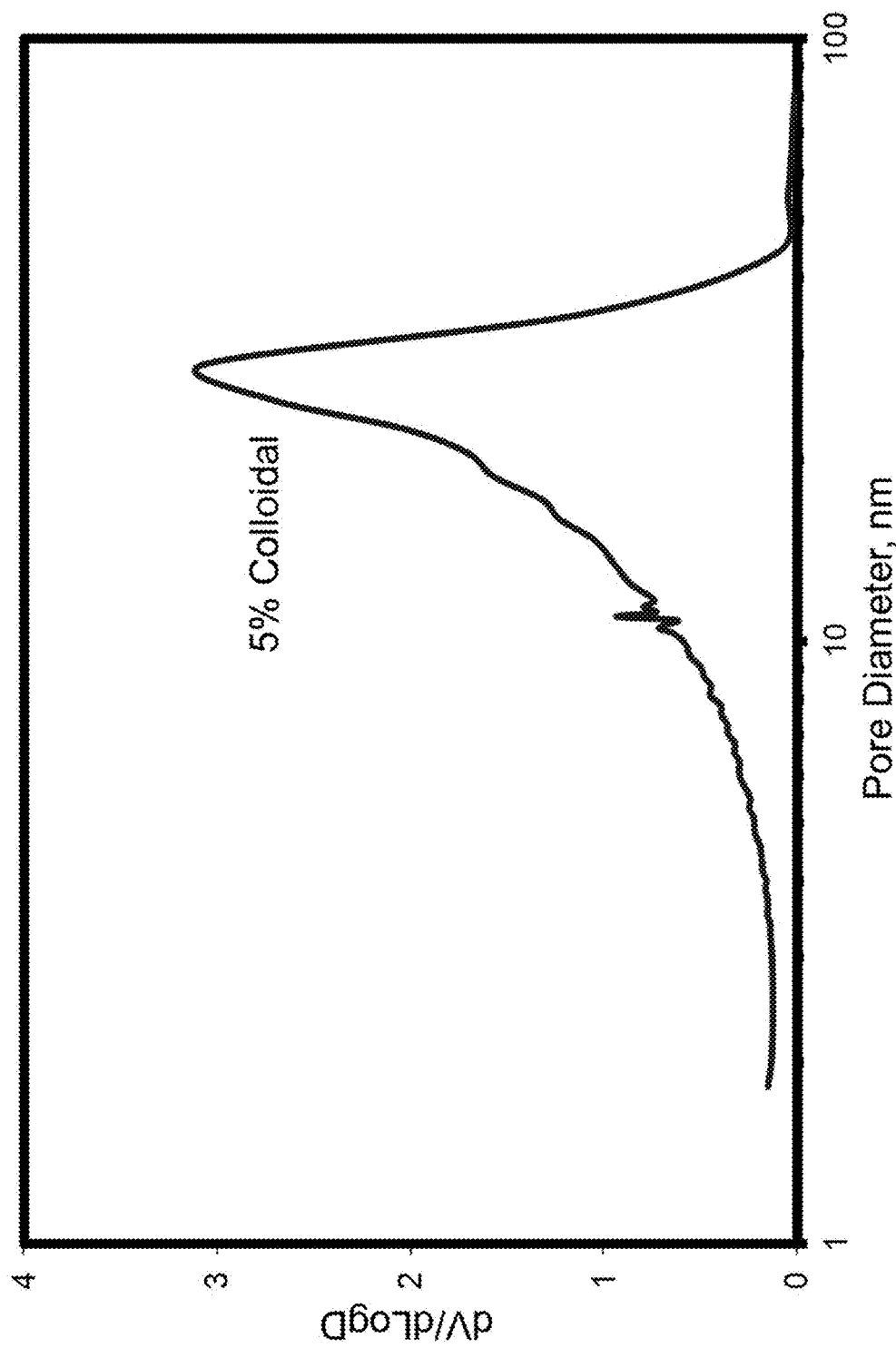
Figure 8:
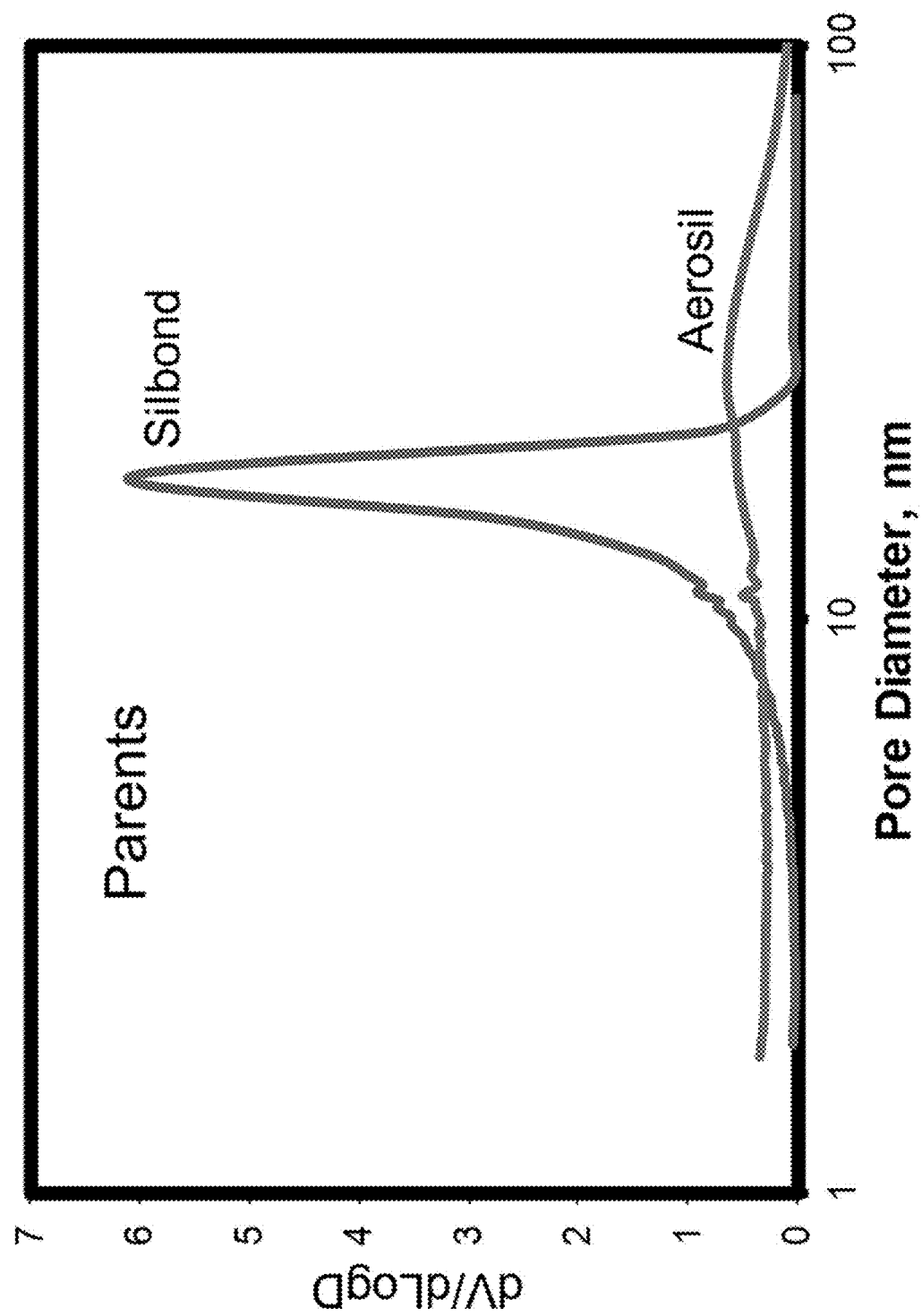
FIGS. 8-11 present plots of the pore volume distributions as a function of pore diameter (nm) for the silicate oligomer, the fumed silica, and the silica composites prepared from the silicate oligomer and the fumed silica, of Example 2.
Figure 9:
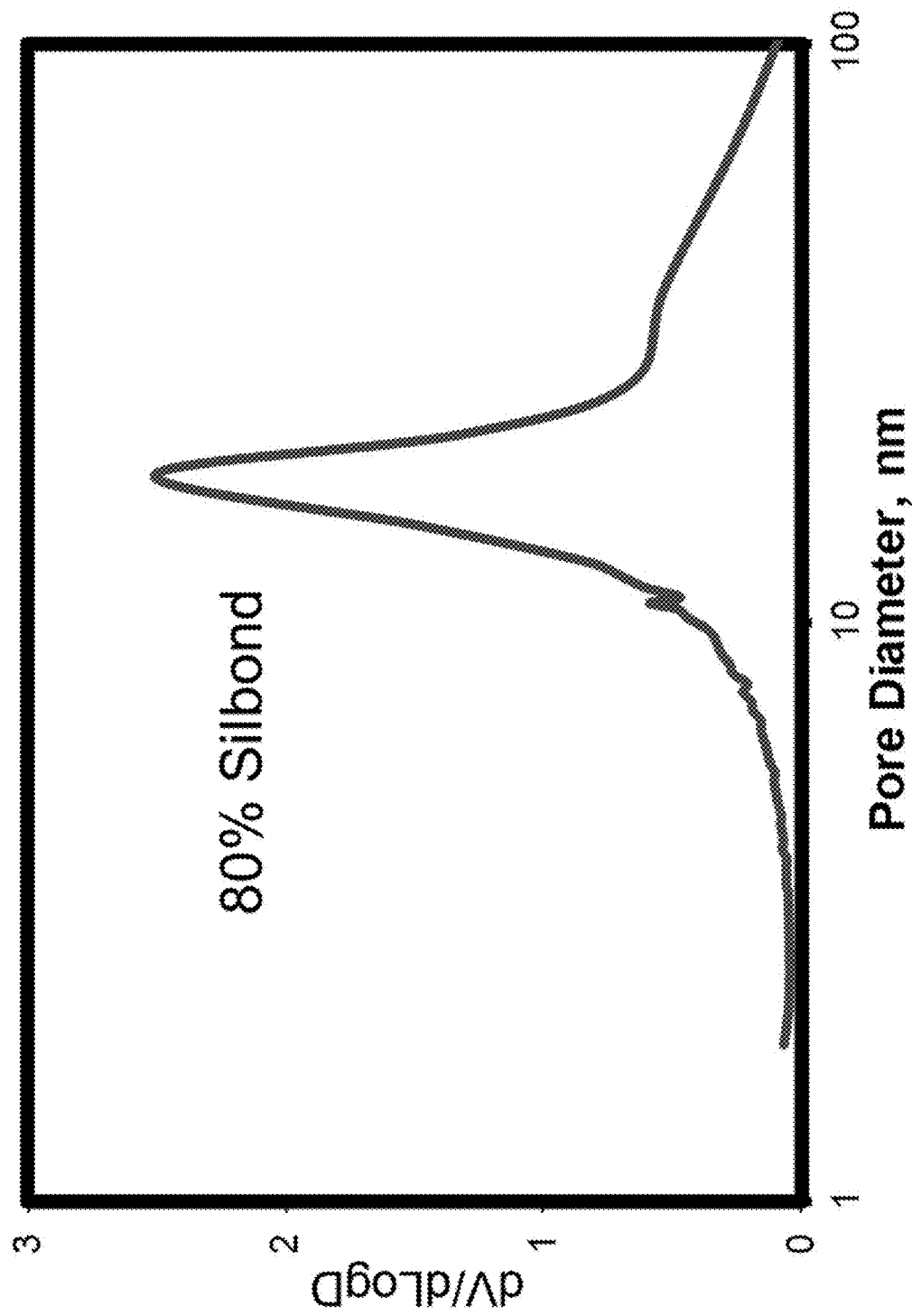
Figure 10:
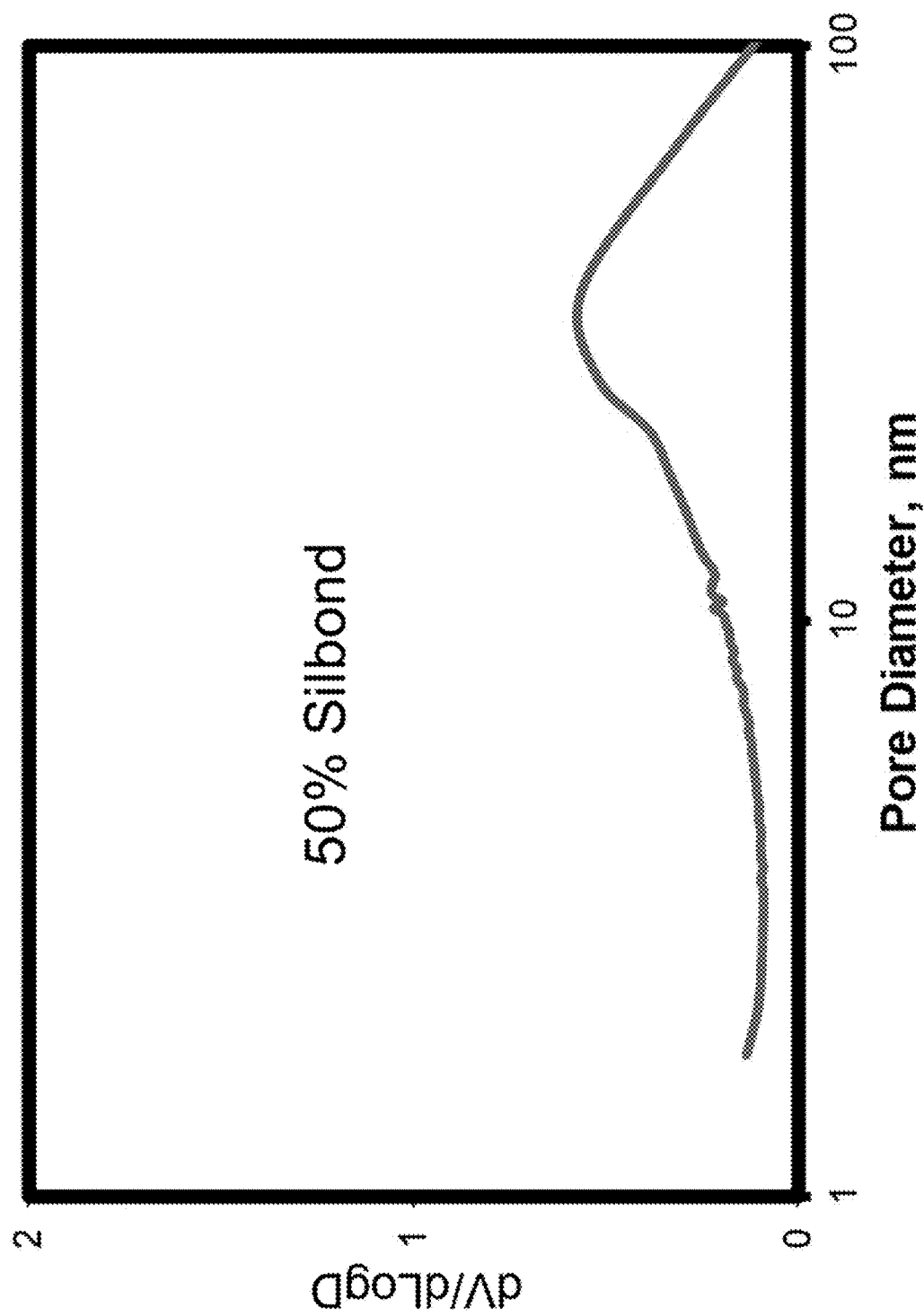
Figure 11:
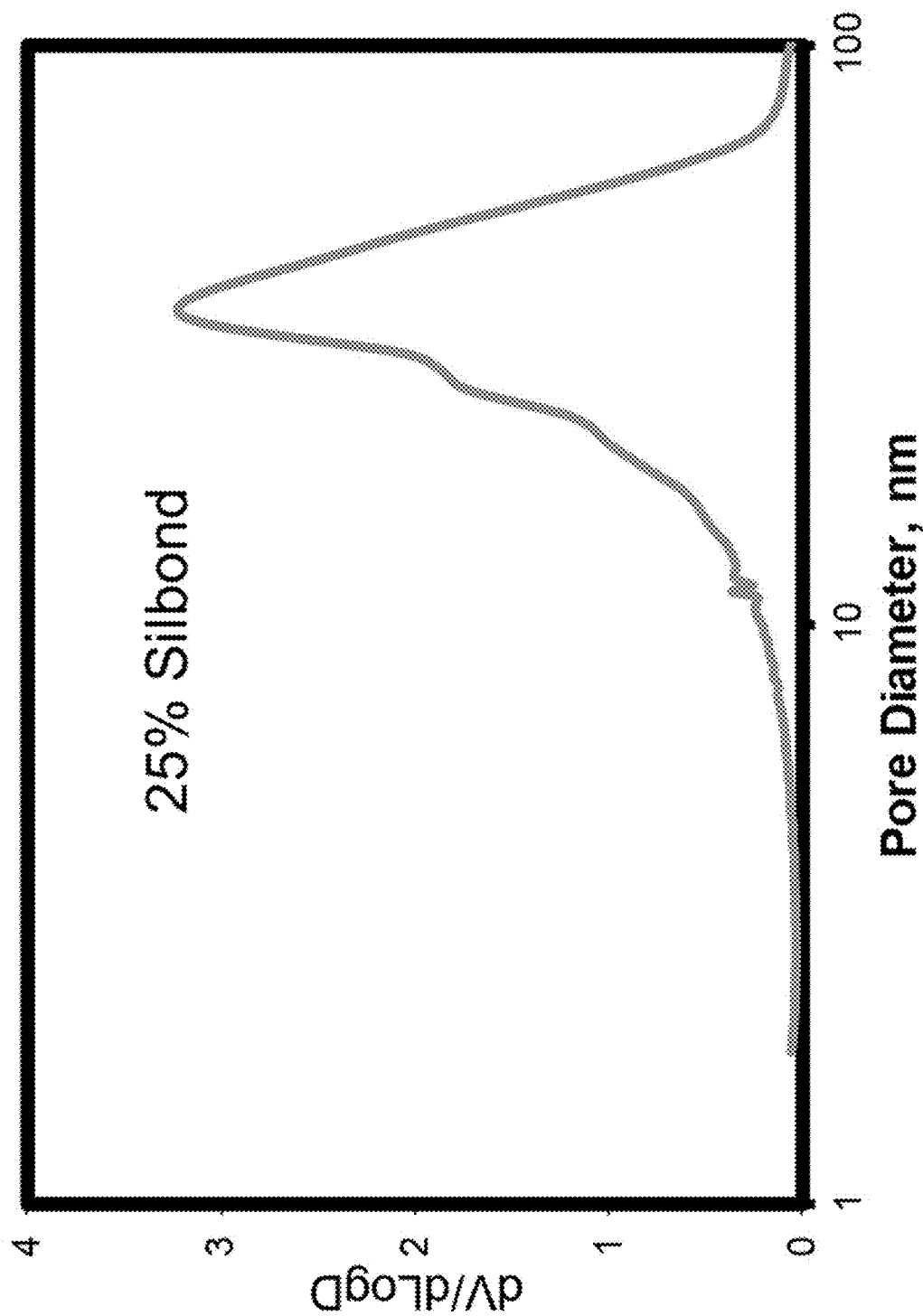

Silica component I was obtained from Cabot Corp. under the name of Cabosil® S17D. It had a very light, feathery structure, and is described as non-porous, being obtained from the flame hydrolysis technique, i.e., a "fumed" silica. Fumed silicas were estimated using an electron micrograph to have an average aspect ratio of about 5:1 (see e.g., FIG. 2 in Forsman et al., Can. J. Phys. 65, 767 (1987), incorporated herein by reference in its entirety). Silica component I was used as a "scaffold" or "framework" component of the silica composites.

The fumed silica component I was first slurried in enough water to produce a wet liquid component, although suitable silica I components also can be supplied "wet" in liquid dispersions of ~20 wt. % solids. Typically, it took about 10 mL of water to slurry each gram of fumed silica in Example 1. Next, colloidal silica component II (Ludox® "glue" silica) was added, and in some subsequent examples, titanium and chromium components in order to prepare a supported polymerization catalyst. Tyzor® TE, a triethanolamine titanate complex obtained from Dorf Ketal, was used to add titanium (being alkaline, it was compatible with the Ludox® component). Chromium (III) acetate was used as the chromium source. After all of the silica components (and transition metal components, if used) were combined into a slurry, the pH was adjusted to neutrality by the dropwise addition of acetic acid. Usually the slurry gelled, or at least thickened, as pH 7 was approached. This gel was then dried overnight in a vacuum oven set at 100° C. This procedure was used to produce the silica composites summarized in Tables I-IV and FIGS. 1-7.

In some experiments, the slurry was simply allowed to stand until it gelled. For instance, one sample using 100% Ludox® colloidal silica (no fumed silica), after the titanium and chromium components were added, was allowed to stand at room temperature, and after several days it gelled spontaneously.

And in a few other experiments, the Ludox® colloidal silica was quickly added to an acid solution to rapidly convert the suspension from a base-stabilized solution into an acid-stabilized solution. Oxalic acid was dissolved in water as the acid component, which could then be used to dissolve freshly precipitated titanium dioxide. When an amine was added to neutralize the oxalic acid, gelation occurred, this time from the acidic pH side.

FIGS. 1-7 illustrate the pore volume distributions as a function of pore diameter (nm) for the colloidal silica (silica component II), the fumed silica (silica component I), and the silica composites prepared from the two silica components (i.e., a colloidal silica and a fumed silica). These figures demonstrate, unexpectedly, how the pore volume distribution was affected by the relative amount of colloidal silica that was used. An object of these experiments was to produce a large amount of meso-pores (generally, 10-100 nm diameter, and especially 30-100 nm), with a minimum amount of small pores (less than 10 nm diameter, and especially less than 5 nm, and most especially less than 3 nm). Very large pores (often greater than 100 nm) are also not particularly beneficial, because they can contribute to dust during handling (usually because they represent low bulk density powder). As shown in FIGS. 1-7, silica composites with peak pore diameters of over 10 nm were surprisingly found when silica component II (colloidal silica "glue" component) was less than 25 wt. % of the total silica, and the amount of meso-pores (generally, 10-100 nm diameter, and especially 30-100 nm) was even higher when silica component II was in the 5-15 wt. % range.

Some of the data expressed graphically in FIGS. 1-7 is tabulated in Tables I-IV. Table I shows the result of summing up the pore volume into several pore size categories, using the dV/d Log D values obtained from nitrogen desorption curves. Table I also summarizes total pore volume, BET surface area, and bulk density of the silica components and silica composites. Table II provides the same pore volume distribution, but expressed in absolute terms (mL/g). Similar data for surface areas as a function of pore diameter are summarized in Table III and Table IV, using dS/d log D. Since the activity of the catalyst is proportional to the surface area, the relative contributions of various pore sizes to the overall activity of the catalyst can be determined. These tables also include a column (25+Ti) for a silica composite prepared with 25 wt. % colloidal silica, and in which titanium was added to prior to formation of the composite (silica-titania)—see description of Example 3A provided below. Once the silica composite (containing titanium) was dried and sieved, a portion was calcined in air at 500° C. and analyzed similarly to the other silica composites in the tables and figures.

As shown by these tables and figures, silica composites were produced with bulk densities in the 0.1-0.35 g/mL range, total pore volumes in the 0.4-1.2 mL/g range, BET surface areas in the 290-360 m²/g range, peak pore diameters in the 9-30 nm range, and average pore diameters in the 8-13 nm range. Further, some of these silica composites also had the percentage of the total pore volume in pores with diameters in the 10-50 nm range (or 10-100 nm range) in the 28-72% range, the percentage of the total pore volume in pores with diameters in the 30-100 nm range in the 14% range, the percentage of the total pore volume in pores with diameters of less than or equal to 5 nm in the 7-13% range, pore volumes of pores with diameters in the 10-50 nm range (or 10-100 nm range) in the 0.2-0.9 mL/g range, the percentage of the total surface area in pores with diameters in the 10-50 nm range (or 10-100 nm range) in the 18-47% range, the percentage of the surface area in pores with diameters of less than or equal to 5 nm in the 18-28% range, and surface areas of pores with diameters in the 10-50 nm range (or 10-100 nm range) in the 58-170 m²/g range.

Significantly, note the unexpectedly high peak pore diameters when silica component II (colloidal silica) was in the 5-15 wt. % range, and additionally, total pore volumes much higher than either of the two component silicas.

Example 2

Silica Composites Prepared from Fumed Silica and Silicate Oligomer

In Example 2, silica component I was obtained from Evonik Corp. under the name of Aerosil® 380 (a "fumed" silica). Silica component II (a "glue" component) was a hydrolyzed ethyl polysilicate, available from Evonik as Silbond® 40. It is a condensed ethyl polysilicate having an average molecular weight of about 800.

First, 20 g of Aerosil® 380 were added to 100 mL of isopropanol, 30 mL of water, and 10 mL of concentrated $NH_4OH$. The slurry was stirred vigorously for a few minutes, and then the Silbond® 40 was quickly added. In the presence of the base, it instantly hydrolyzed and gelled, incorporating the Aerosil® into the overall structure. The gel was then washed once in water, and dried. After calcination at 400° C., the resulting silica composites summarized in Tables V-VIII and FIGS. 8-11 were produced.

In Example 2, gelation occurred from the basic side. However, another method of creating such composites can be to combine the Aerosil® in an acidic suspension (using oxalic acid, for example, as the acid component), and optionally chromium and/or titanium components. The alcoholic Silbond® 40 solution then can be added to the acid solution, which hydrolyzes Silbond® to create very small "glue" particles, typically small enough to produce a surface area of 500 to 1000 $m^2/g$ from the Silbond® 40 component alone. Gelation is then caused by neutralizing the acid by the addition of ammonia or an amine.

FIGS. 8-11 illustrate the pore volume distributions as a function of pore diameter (nm) for the Silbond® silica (silica component II), the Aerosil® fumed silica (silica component I), and the silica composites prepared from the two silica components (i.e., a Silbond® silica and a fumed silica). These figures demonstrate, unexpectedly, how the pore volume distribution was affected by the relative amount of Silbond® silica that was used. As shown in FIGS. 8-11, silica composites with peak pore diameters of greater than 10 nm were surprisingly found when silica component II (Silbond® silica "glue" component) was 25-80 wt. % of the total silica, and the amount of meso-pores (generally, 10-100 nm diameter, and especially 30-100 nm) was very high when silica component II was 25 wt. %.

Some of the data expressed graphically in FIGS. 8-11 is tabulated Tables V-VIII. Table V shows the result of summing up the pore volume into several pore size categories, using the dV/d Log D values obtained from nitrogen desorption curves. Table V also summarizes total pore volume, BET surface area, and bulk density of the silica components and silica composites. Table VI provides the same pore volume distribution, but expressed in absolute terms (mL/g). Similar data for surface areas as a function of pore diameter are summarized in Table VII and Table VIII, using dS/d log D. Since the activity of the catalyst is proportional to the surface area, the relative contributions of various pore sizes to the overall activity of the catalyst can be determined.

As shown by these tables and figures, silica composites were produced with bulk densities in the 0.25-0.31 g/mL range, total pore volumes in the 0.5-1.3 mL/g range, BET surface areas in the 190-240 $m^2/g$ range, peak pore diameters in the 18-38 nm range, and average pore diameters in the 10-24 nm range. Further, some of these silica composites also had the percentage of the total pore volume in pores with diameters in the 10-50 nm range (or 10-100 nm range) in the 40-85% range, the percentage of the total pore volume in pores with diameters in the 30-100 nm range in the 4-30% range, the percentage of the total pore volume in pores with diameters of less than or equal to 5 nm in the 3-20% range, pore volumes of pores with diameters in the 10-50 nm range (or 10-100 nm range) in the 0.2-1.1 mL/g range, the percentage of the total surface area in pores with diameters in the 10-50 nm range (or 10-100 nm range) in the 20-65% range, the percentage of the surface area in pores with diameters of less than or equal to 5 nm in the 8-42% range, and surface areas of pores with diameters in the 10-50 nm range (or 10-100 nm range) in the 40-140 $m^2/g$ range.

Significantly, note the unexpectedly high peak pore diameter, average pore diameter, total pore volume, and the percentage of the total pore volume in pores with diameters in the 30-100 nm range, when silica component II (Silbond® silica) was 25 wt. %.

Example 3

Catalyst Preparation and Polymerization Experiments

Catalysts were produced using the techniques described in Examples 1-2, in which suitable titanium-containing compounds and chromium-containing compounds were added to the slurry prior to or after gelation. After drying the supported chromium catalyst, the catalyst was then calcined at 650° C. for three hours, and then tested for polymerization activity in a 2.2-L stainless steel reactor. Isobutane (2 L) was used in all runs. A small amount of the activated chromium catalyst was added through a charge port while slowly venting isobutane vapor. The charge port was closed and the isobutane was added. The contents of the reactor were stirred and heated to the desired run temperature of 105° C., and ethylene was then introduced into the reactor (no comonomer, hydrogen, or co-catalyst was used). Ethylene was fed on demand to maintain a reactor pressure of 550 psig for the desired length of each polymerization experiment. Subsequently, the reactor was vented and cooled, and the polymer recovered.

For Example 3A, 15 g of Cabosil® S17D (410 $m^2/g$ fumed silica from Cabot Corp) was used as silica component I, and 5 g of Ludox® SM-AS silica (20 g of a 25% suspension) was used as silica component II. Both components were added to 50 mL of water into which 5.3 g of Tyzor® TE (triethanolamine titanate) had been dissolved. The paste that was initially formed was stirred and kneaded by hand for about 15 minutes, which turned it into a thick liquid. The liquid was set aside overnight, which allowed it to turn into a gel. It was then dried for 12 hours in a vacuum oven set at 100° C.

Hard chunks resulted which were then ground into a powder that went through a 35 mesh screen. Approximately 10 g of the resulting dry silica-titania powder (~3.5 wt. % titanium) were then placed in a quartz activator tube along with 0.67 g of chromium (III) acetylacetonate powder. The physical mixture was heated under flowing dry air to 650° C., which caused sublimation of the chromium and its subsequent incorporation onto the silica-titania support. After three hours of fluidization at 650° C. in dry air, the catalyst was cooled and stored under dry nitrogen. It was a homogeneous orange color, indicating that the chromium attached to the support as a hexavalent species. The catalyst had a BET surface area of 320 $m^2/g$ and a pore volume of 1.04 mL/g.

A sample of this catalyst (0.0995 g) was introduced into the reactor, and the ethylene polymerization experiment was conducted at 105° C. and 550 psig ethylene for 2 hr. The catalyst produced 160 g of polymer—a productivity of 1608 g/g. The polymer had a surprisingly high HLMI of 18.4, as compared to 5 HLMI typically resulting from catalysts made of plain silica gels.

For Example 3B, 9 g of Cabosil® S17D were combined with 1 g of Ludox® SM-AS (4 mL) and 100 mL of water. The resulting slurry was stirred for 10 min to fully mix the two silica components. Chromium acetate (0.43 g) was added to the slurry, followed by a few drops of acetic acid in order to neutralize the ammonia that came from the Ludox®. After the pH was neutral, the slurry thickened considerably, and it was then allowed to dry overnight at 25° C. in the open air. This produced hard catalyst chunks that were ground up and sieved through a 35 mesh screen. The catalyst had a BET surface area of 347 $m^2/g$ and a pore volume of 1.00 mL/g.

The resulting catalyst was then activated in flowing dry air at 650° C. for 2-3 hr to produce an orange catalyst. A small sample of this catalyst (0.1731 g) was then introduced into the reactor, and the polymerization experiment was performed as described above. The catalyst produced 191 g of polymer in 90 min—a productivity of 1103 g/g. The polymer had a HLMI of 6.3, which is unexpectedly higher than commercial Cr/silica catalysts activated and tested under the same conditions.

For Example 3C, into 659 mL of isopropanol was added 55 mL of water, and 11 mL of concentrated ammonium hydroxide (28% $NH_3$), along with 31 g of Aerosil® 380, then stirred vigorously at the maximum rate for 45 min in order to break up Aerosil® agglomerates. Next, 25 mL of Silbond® 40 (10.6 g $SiO_2$) were added to the mixture. Within 5 min, the ammonia had hydrolyzed the Silbond® 40 to produce a gel, as evidenced by thickening of the slurry. After standing overnight, the silica was filtered out of the slurry and washed in 2 L of water. After a second filtration, the solids were dried in a vacuum oven overnight at 100° C. After pushing through a 35 mesh screen, the resulting silica composite powder had a BET surface area of 215 $m^2/g$ and a pore volume of 1.27 mL/g.

A 10-g sample of this powder was dry mixed with 0.67 g of chromium (III) acetylacetonate powder, and then calcined at 650° C. for three hours, producing an orange powder, indicating attachment of chromium and conversion to hexavalent chromium. A small sample of this catalyst (0.1625 g) was then introduced into the reactor, and the polymerization experiment was performed as described above. The catalyst produced 216 g of polymer in 78 min—a productivity of 1329 g/g. The polymer had a HLMI of 2.2.

For Example 3D, into 100 mL of water was added 5.51 g oxalic acid hydrate, 6.65 mL of titanium isopropoxide, 5 mL of 30% $H_2O_2$, 5.07 mL of dimethyl formamide, and 1.16 g of chromium acetate. After about 5 min of stirring, an orange solution formed. Then, 8 g of Ludox® SM-AS were added, followed by 30 g of Aerosil® 308 to form a slurry. A few mL of 28% ammonium hydroxide solution was added to bring the pH to 7. The slurry thickened, indicating gelation, and the mixture was allowed to dry at 25° C. over three days. Semi-hard red chunks were formed, which were ground up and passed through a 35 mesh screen.

The resulting catalyst was then calcined as described above in dry air at 650° C. for 3 hr, producing an orange catalyst. A small sample of this catalyst (0.0708 g) was then introduced into the reactor, and the polymerization experiment was performed as described above. The catalyst produced 193 g of polymer in 114 min—a productivity of 2726 g/g. The polymer had a HLMI of 26.1.

For Example 3E, the procedure used to make catalyst 3B was repeated except that 9.5 g of Cabosil® S17D were used and 0.5 g of Ludox® SM-AS (2 mL) were used. The silica composite had a BET surface area of 359 $m^2/g$ and a pore volume of 1.15 mL/g. After calcination at 650° C., 0.2254 g of this catalyst produced 241 g of polymer in 102 min—a productivity of 1069 g/g. The polymer had a 7.1 HLMI.

For Example 3F, a solution was made from 335 mL water, 12.4 g of Tyzor® TE (titanium triethanolamine chelate), 1.25 g of chromium acetate, and 4.9 g of Ludox® SM-AS silica (19.6 mL of the Ludox® solution). Then, 30 g of Aerosil® 380 were added to make a slurry. After heating to boiling for 30 min, gelation occurred. After drying overnight in a vacuum over at 100° C., semi-hard chunks were produced, which were ground up and passed through a 35 mesh screen. After calcination at 650° C., 0.1024 g of this catalyst produced 194 g of polymer in 105 min—a productivity of 1895 g/g. The polymer had a 19.3 HLMI.

For Example 3G, a procedure similar to Example 3F was followed. The catalyst was made by spray drying a slurry containing 90 wt. % Aerosil® 380 and 10 wt. % Ludox® SM-AS, along with Tyzor® TE (to equal 3.5 wt. % titanium on the final catalyst) and chromium acetate (to equal 1 wt. % chromium on the final catalyst). A fine catalyst powder was produced which, after calcination at 650° C., had a productivity of 2537 g/g (0.041 g of catalyst producing 104 g of PE in 143 min). The polymer had an HLMI of 38.6.

Table IX summarizes certain characteristics (surface area, pore volume, average pore diameter, peak pore diameter) of the silica composites and catalysts used in Examples 3A-3G, and various properties of the ethylene polymers produced using the respective catalysts. Table X shows the result of summing up the pore volume into several pore size categories, using the dV/d Log D values obtained from nitrogen desorption curves for the silica composites and catalysts 3A-3C and 3E, and also includes total pore volume, BET surface area, and peak and average pore diameter. Table XI provides the same pore volume distribution, but expressed in absolute terms (mL/g). In these tables, the surface area, pore volume, average pore diameter, peak pore diameter, bulk density, pore size and surface area distribution, etc., characteristics are for the silica composites. No significant change is expected due to the addition of chromium to form a supported catalyst and, therefore, it is expected that substantially the same data in Tables IX-XI will apply for the supported catalyst as listed for the silica composite.

As shown by these tables, silica composites (and therefore, supported chromium catalysts) were produced with total pore volumes in the 1-1.3 mL/g range, BET surface areas in the 215-360 $m^2/g$ range, peak pore diameters in the 17-35 nm range, and average pore diameters in the 11-24 nm range. Further, some of these silica composites also had the percentage of the total pore volume in pores with diameters in the 10-50 nm range (or 10-100 nm range) in the 50-85% range, the percentage of the total pore volume in pores with diameters in the 30-100 nm range in the 1-30% range, the percentage of the total pore volume in pores with diameters of less than or equal to 5 nm in the 3-11% range, and pore volumes of pores with diameters in the 10-50 nm range (or 10-100 nm range) in the 0.5-1.1 mL/g range.

TABLE I

Example 1

| | Colloidal Silica (wt. %) | | | | | | | | |
|---|---|---|---|---|---|---|---|---|---|
| | 100 | 65 | 50 | 25 | 15 | 10 | 5 | 0 | 25 + Ti |
| Peak pore diam. (nm) | 6.2 | 6.0 | 6.7 | 9.0 | 26.3 | 25.8 | 28.8 | 25.9 | 17.3 |
| Average pore diam (nm) | 9.8 | 5.9 | 6.7 | 8.5 | 11.1 | 11.5 | 12.8 | 7.6 | 13.0 |
| Total PV (mL/g) | 0.47 | 0.48 | 0.50 | 0.66 | 0.94 | 1.00 | 1.15 | 0.71 | 1.04 |
| BET surface area ($m^2/g$) | 191 | 324 | 296 | 312 | 339 | 347 | 359 | 372 | 320 |
| Bulk density (g/mL) | 0.37 | 0.33 | 0.31 | 0.28 | 0.24 | 0.21 | 0.14 | 0.04 | 0.27 |
| PV <3 nm diam. (%) | 1.0 | 1.4 | 0.7 | 0.9 | 1.9 | 1.9 | 1.5 | 9.1 | 2.1 |
| PV 3-5 nm diam. (%) | 21.9 | 30.5 | 15.3 | 8.2 | 10.4 | 9.1 | 6.4 | 19.8 | 8.1 |
| PV 5-10 nm diam. (%) | 76.4 | 67.1 | 82.5 | 62.2 | 45.4 | 39.4 | 20.2 | 36.6 | 26.7 |
| PV 10-50 nm diam. (%) | 0.7 | 1.0 | 1.5 | 28.7 | 42.1 | 49.6 | 71.7 | 32.7 | 62.7 |
| PV 50-100 nm diam. (%) | — | — | — | — | 0.2 | 0.1 | 0.2 | 1.3 | 0.4 |
| PV >100 nm diam. (%) | — | — | — | — | — | — | — | 0.5 | — |
| PV 30-100 nm diam. (%) | — | 0.1 | — | 0.1 | 2.3 | 1.0 | 3.6 | 4.6 | 3.2 |

TABLE II

Example 1

| | Colloidal Silica (wt. %) | | | | | | | | |
|---|---|---|---|---|---|---|---|---|---|
| | 100 | 65 | 50 | 25 | 15 | 10 | 5 | 0 | 25 + Ti |
| | Data in mL/g, based on dV/dlogD | | | | | | | | |
| <3 nm diam. | 0.01 | 0.01 | — | 0.01 | 0.02 | 0.02 | 0.02 | 0.06 | 0.02 |
| 3-5 nm diam. | 0.10 | 0.14 | 0.08 | 0.05 | 0.10 | 0.09 | 0.07 | 0.14 | 0.08 |
| 5-10 nm diam. | 0.36 | 0.32 | 0.41 | 0.41 | 0.43 | 0.39 | 0.23 | 0.26 | 0.28 |
| 10-50 nm diam. | 0.01 | 0.01 | 0.19 | 0.40 | 0.50 | 0.83 | 0.23 | 0.65 | |
| 50-100 nm diam. | — | — | — | — | — | — | — | 0.01 | 0.01 |
| >100 nm diam. | — | — | — | — | — | — | — | — | — |
| Total | 0.47 | 0.48 | 0.50 | 0.66 | 0.94 | 1.00 | 1.15 | 0.71 | 1.04 |
| 30-100 nm diam. | — | — | — | — | 0.02 | 0.01 | 0.04 | 0.03 | 0.03 |

TABLE III

Example 1

| | Colloidal Silica (wt. %) | | | | | | | | |
|---|---|---|---|---|---|---|---|---|---|
| | 100 | 65 | 50 | 25 | 15 | 10 | 5 | 0 | 25 + Ti |
| >100 nm diam. (%) | — | — | — | — | — | — | — | — | — |
| 50-100 nm diam. (%) | — | — | — | — | — | — | — | 0.1 | 0.1 |
| 10-50 nm diam. (%) | 0.3 | 0.4 | 0.7 | 18.6 | 22.8 | 28.7 | 46.5 | 13.3 | 37.8 |
| 5-10 nm diam. (%) | 68.8 | 58.5 | 75.3 | 62.9 | 49.7 | 45.1 | 29.2 | 31.6 | 34.2 |
| 3-5 nm diam. (%) | 28.5 | 37.8 | 22.1 | 15.2 | 20.4 | 18.9 | 16.7 | 29.5 | 18.8 |
| <3 nm diam. (%) | 2.4 | 3.3 | 1.9 | 3.3 | 7.0 | 7.3 | 7.6 | 25.6 | 9.1 |
| 30-100 nm diam. (%) | — | — | — | — | 0.5 | 0.2 | 1.1 | 0.7 | 0.8 |

TABLE IV

Example 1

| | Colloidal Silica (wt. %) | | | | | | | | |
|---|---|---|---|---|---|---|---|---|---|
| | 100 | 65 | 50 | 25 | 15 | 10 | 5 | 0 | 25 + Ti |
| | Data in $m^2/g$, based on dS/dlogD | | | | | | | | |
| >100 nm diam. | — | — | — | — | — | — | — | 0.1 | — |
| 50-100 nm diam. | — | — | — | — | 0.1 | 0.1 | 0.1 | 0.4 | 0.2 |
| 10-50 nm diam. | 0.6 | 1.3 | 2.1 | 58.0 | 77.4 | 99.6 | 166.8 | 49.3 | 121.0 |
| 5-10 nm diam. | 131.3 | 189.7 | 222.9 | 196.4 | 168.6 | 156.6 | 104.9 | 117.5 | 109.3 |
| 3-5 nm diam. | 54.5 | 122.4 | 65.5 | 47.3 | 69.0 | 65.5 | 60.0 | 109.6 | 60.2 |

TABLE IV-continued

Example 1

Colloidal Silica (wt. %)

Data in m²/g, based on dS/dlogD

| | 100 | 65 | 50 | 25 | 15 | 10 | 5 | 0 | 25 + Ti |
|---|---|---|---|---|---|---|---|---|---|
| <3 nm diam. | 4.6 | 10.6 | 5.5 | 10.3 | 23.9 | 25.2 | 27.2 | 95.1 | 29.3 |
| Total | 191 | 324 | 296 | 312 | 339 | 347 | 359 | 372 | 320 |
| 30-100 nm diam. | — | — | — | — | 1.7 | 0.8 | 3.8 | 2.4 | 2.6 |

TABLE V

Example 2

| Silbond ® Silica (wt. %) | 100 | 80 | 50 | 25 | 0 |
|---|---|---|---|---|---|
| Peak pore diam. (nm) | 17.8 | 18.0 | 37.7 | 34.5 | 25.9 |
| Average pore diam (nm) | 14.0 | 15.1 | 10.4 | 23.6 | 7.6 |
| Total PV (mL/g) | 0.99 | 0.89 | 0.50 | 1.27 | 0.71 |
| BET surface area (m²/g) | 283 | 235 | 192 | 215 | 372 |
| Bulk Density (g/mL) | 0.35 | 0.31 | 0.28 | 0.25 | 0.05 |
| PV > 100 nm diam. (%) | — | 0.4 | 0.9 | 0.3 | 0.5 |
| PV 50-100 nm diam. (%) | — | 1.6 | 3.6 | 1.5 | 1.3 |
| PV 10-50 nm diam. (%) | 72.9 | 67.2 | 42.7 | 82.7 | 32.7 |
| PV 5-10 nm diam. (%) | 23.3 | 24.2 | 32.9 | 11.9 | 36.6 |
| PV 3-5 nm diam (%) | 3.3 | 5.4 | 13.5 | 2.8 | 19.8 |
| PV < 3 nm diam (%) | 0.5 | 1.3 | 6.3 | 0.8 | 9.1 |
| PV 30-100 nm diam. (%) | 0.3 | 4.9 | 10.3 | 29.5 | 4.6 |

TABLE VI

Example 2

| Silbond ® Silica (wt. %) | 100 | 80 | 50 | 25 | 0 |
|---|---|---|---|---|---|
| Data in mL/g, based on dV/dlogD | | | | | |
| >100 nm diam. | — | — | 0.01 | — | — |
| 50-100 nm diam. | — | 0.01 | 0.02 | 0.02 | 0.01 |
| 10-50 nm diam. | 0.72 | 0.60 | 0.21 | 1.05 | 0.23 |
| 5-10 nm diam. | 0.23 | 0.22 | 0.16 | 0.15 | 0.26 |
| 3-5 nm diam. | 0.03 | 0.05 | 0.07 | 0.04 | 0.14 |
| <3 nm diam. | — | 0.01 | 0.03 | 0.01 | 0.06 |
| Total | 0.99 | 0.89 | 0.50 | 1.27 | 0.71 |
| 30-100 nm diam. | — | 0.04 | 0.05 | 0.37 | 0.03 |

TABLE VII

Example 2

| Silbond ® Silica (wt. %) | 100 | 80 | 50 | 25 | 0 |
|---|---|---|---|---|---|
| >100 nm diam. (%) | — | — | 0.1 | — | — |
| 50-100 nm diam. (%) | — | 0.2 | 0.4 | 0.4 | 0.1 |
| 10-50 nm diam. (%) | 55.4 | 46.4 | 20.8 | 64.2 | 14.2 |
| 5-10 nm diam. (%) | 33.4 | 33.5 | 36.2 | 27.1 | 33.9 |
| 3-5 nm diam. (%) | 8.7 | 13.7 | 26.1 | 8.2 | 31.7 |
| <3 nm diam. (%) | 2.4 | 6.2 | 16.4 | — | 20.0 |
| 30-100 nm diam. (%) | 0.1 | 1.2 | 1.8 | 13.0 | 0.7 |

TABLE VIII

Example 2

| Silbond ® Silica (wt. %) | 100 | 80 | 50 | 25 | 0 |
|---|---|---|---|---|---|
| Data in m²/g, based on dS/dlogD | | | | | |
| >100 nm diam. | — | 0.1 | 0.1 | 0.1 | 0.1 |
| 50-100 nm diam. | — | 0.6 | 0.8 | 0.8 | 0.5 |
| 10-50 nm diam. | 156.9 | 109.0 | 39.9 | 138.1 | 52.9 |
| 5-10 nm diam. | 94.6 | 78.7 | 69.6 | 58.3 | 126.2 |
| 3-5 nm diam. | 24.7 | 32.2 | 50.1 | 17.7 | 117.6 |
| <3 nm diam. | 6.7 | 14.5 | 31.5 | — | 74.5 |
| Total | 283 | 235 | 192 | 215 | 372 |
| 30-100 nm diam. | 0.2 | 2.7 | 3.5 | 28.0 | 2.6 |

TABLE IX

Example 3

| | 3A | 3B | 3C | 3D | 3E | 3F | 3G |
|---|---|---|---|---|---|---|---|
| Silica I | Cabosil ® | Cabosil ® | Aerosil ® | Aerosil ® | Cabosil ® | Aerosil ® | Cabosil ® |
| Silica II | Ludox ® | Ludox ® | Si'bond ® | Ludox ® | Ludox ® | Ludox ® | Ludox ® |
| Ratio of I:II | 75:25 | 90:10 | 75:25 | 80:20 | 95:5 | 86:14 | 90:10 |
| Surface area (m²/g) | 320 | 347 | 215 | — | 359 | — | — |
| Pore volume (mL/g) | 1.04 | 1.00 | 1.27 | — | 1.15 | — | — |
| Avg pore diam (nm) | 13.0 | 11.5 | 23.6 | — | 12.8 | — | — |
| Peak pore diam (nm) | 17.3 | 25.8 | 34.5 | — | 28.8 | — | — |
| Bulk density (g/mL) | 0.27 | 0.21 | 0.24 | — | 0.14 | — | — |
| Productivity (g/g) | 1608 | 1103 | 1329 | 2726 | 1069 | 1895 | 2537 |
| MI—$I_2$ (g/10 min) | 0.09 | — | — | 0.25 | — | 0.10 | 0.55 |
| $I_{10}$ (g/10 min) | 3.5 | 0.8 | — | 4.9 | 1.0 | 3.3 | 8.4 |
| HLMI—$I_{21}$ (g/10 min) | 18.4 | 6.3 | 2.2 | 26.1 | 7.1 | 19.3 | 38.6 |
| $I_{21}/I_2$ (HLMI/MI) | 212 | — | — | 104 | — | 202 | 70 |
| $I_{21}/I_{10}$ | 5.2 | 8.0 | — | 5.3 | 7.1 | 5.8 | 4.5 |
| Mn (kg/mol) | 20 | 20 | 24 | — | 23 | — | — |
| Mw (kg/mol) | 235 | 253 | 320 | — | 231 | — | — |
| Mz (kg/mol) | 1759 | 1761 | 2059 | — | 1527 | — | — |

TABLE IX-continued

Example 3

| | \multicolumn{7}{c}{Example} |
| --- | --- | --- | --- | --- | --- | --- | --- |
| | 3A | 3B | 3C | 3D | 3E | 3F | 3G |
| Mw/Mn | 11.6 | 12.7 | 13.1 | — | 9.7 | — | — |
| Mz/Mw | 7.5 | 7.0 | 6.4 | — | 6.6 | — | — |
| $\eta_0$ (MPa-sec) | 0.71 | 2.24 | 4.95 | — | 0.92 | — | — |
| Tau (sec) | 2.9 | 11.3 | 30.7 | — | 3.8 | — | — |
| CY-a | 0.18 | 0.18 | 0.20 | — | 0.20 | — | — |

TABLE X

Example 3

| Example | 3A | 3B | 3C | 3E |
| --- | --- | --- | --- | --- |
| Peak pore diam. (nm) | 17.3 | 25.8 | 34.5 | 28.8 |
| Average pore diam (nm) | 13.0 | 11.5 | 23.6 | 12.8 |
| Total PV (mL/g) | 1.04 | 1.00 | 1.27 | 1.15 |
| BET surface area (m²/g) | 320 | 347 | 215 | 359 |
| PV > 100 nm diam. (%) | — | — | 0.3 | — |
| PV 50-100 nm diam. (%) | 0.4 | 0.1 | 1.5 | 0.2 |
| PV 10-50 nm diam. (%) | 62.7 | 49.6 | 82.7 | 71.7 |
| PV 5-10 nm diam. (%) | 26.7 | 39.4 | 11.9 | 20.2 |
| PV 3-5 nm diam. (%) | 8.1 | 9.1 | 2.8 | 6.4 |
| PV < 3 nm diam. (%) | 2.1 | 1.9 | 0.8 | 1.5 |
| PV 30-100 nm diam. (%) | 3.2 | 1.0 | 29.5 | 3.6 |

TABLE XI

Example 3

| Example | 3A | 3B | 3C | 3E |
| --- | --- | --- | --- | --- |
| \multicolumn{5}{c}{Data in mL/g, based on dV/dlogD} | | | | |
| >100 nm diam. | — | — | — | — |
| 50-100 nm diam. | — | — | 0.02 | — |
| 10-50 nm diam. | 0.65 | 0.50 | 1.05 | 0.83 |
| 5-10 nm diam. | 0.28 | 0.39 | 0.15 | 0.23 |
| 3-5 nm diam. | 0.08 | 0.09 | 0.04 | 0.07 |
| <3 nm diam. | 0.02 | 0.02 | 0.01 | 0.02 |
| Total | 1.04 | 1.00 | 1.27 | 1.15 |
| 30-100 nm diam. | 0.03 | 0.01 | 0.37 | 0.04 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process for preparing a silica composite (composition), the process comprising:
(1) combining silica component I and silica component II in a diluent comprising at least about 70 wt. % water to form a mixture; and
(2) forming the (co-gelled) silica composite in the mixture; wherein:
silica component I comprises irregular and non-spherical silica particles characterized by an average aspect ratio of at least about 2:1 and a BET surface area in a range from about 150 to about 1000 m²/g;
silica component II comprises a colloidal silica; and
the silica composite is characterized by:
a bulk density in a range from about 0.08 to about 0.4 g/mL;
a total pore volume from about 0.4 to about 2.5 mL/g;
a BET surface area from about 175 to about 375 m²/g; and
a peak pore diameter from about 10 to about 80 nm.

Aspect 2. The process defined in aspect 1, wherein the diluent comprises any suitable amount of water or an amount in any range disclosed herein, e.g., at least about 80 wt. %, at least about 90 wt. %, at least about 95 wt. %, etc.

Aspect 3. The process defined in aspect 1 or 2, wherein silica component II comprises a Ludox® colloidal silica, a Nyacol® colloidal silica, a Levisil colloidal silica, or any combination thereof.

Aspect 4. The process defined in any one of aspects 1-3, wherein the colloidal silica is characterized by any suitable average aspect ratio or any average aspect ratio disclosed herein (e.g., less than 1.8:1, less than 1.5:1, etc.), any suitable average (d50) particle size or any average (d50) particles size disclosed herein (e.g., from about 3 to about 25 nm, from about 3 to about 18 nm, etc.), and any suitable BET surface area or any BET surface area disclosed herein (e.g., from about 200 to about 1000 m²/g, from about 225 to about 500 m²/g, etc.).

Aspect 5. The process defined in any one of aspects 1-4, wherein the amount of silica component II, based on total amount of silica component I and silica component II, is in any suitable range or any range disclosed herein, e.g., from about 1 to about 35 wt. %, from about 2 to about 25 wt. %, from about 3 to about 20 wt. %, etc.

Aspect 6. The process defined in any one of aspects 1-5, wherein forming (co-gelling) the silica composite in the mixture includes any suitable technique for forming the silica composite or any technique disclosed herein, e.g., adjusting the pH of the mixture, removing water from and/or heating the mixture, adding a metal ion to the mixture, adding an organic solvent (e.g., an alcohol) to the mixture, storing the mixture for a suitable period of time, etc., or any combination thereof.

Aspect 7. A process for preparing a silica composite (composition), the process comprising:
(1) combining silica component I and silica component II in a solvent to form a mixture; and
(2) forming the (co-gelled) silica composite in the mixture; wherein:
silica component I comprises irregular and non-spherical silica particles characterized by an average aspect ratio of at least about 2:1 and a BET surface area in a range from about 150 to about 1000 m²/g;
silica component II comprises a silicon compound (silicon-containing); and
the silica composite is characterized by:
a bulk density in a range from about 0.08 to about 0.4 g/mL;
a total pore volume from about 0.4 to about 2.5 mL/g;
a BET surface area from about 175 to about 375 m²/g; and
a peak pore diameter from about 10 to about 80 nm.

Aspect 8. The process defined in aspect 7, wherein the solvent comprises any suitable solvent or any solvent disclosed herein, e.g., a ketone (e.g., acetone), an alcohol (e.g., methanol, ethanol, n-propanol, isopropanol, etc.), a glycol, an ester, an ether, acetonitrile, etc., or any combination thereof.

Aspect 9. The process defined in aspect 7, wherein the solvent comprises alcohol and water.

Aspect 10. The process defined in any one of aspects 7-9, wherein the silicon compound comprises any suitable silicon compound or any silicon compound disclosed herein, e.g., a silicon alkoxide (e.g., tetraethyl orthosilicate), a silicon halide, a silicon hydride, a silane, a hydrocarbyl silane, a siloxane, etc., or any combination thereof.

Aspect 11. The process defined in any one of aspects 7-9, wherein the silicon compound comprises sodium silicate, an ethyl silicate, a silicate oligomer (e.g., an ethyl silicate oligomer), or any combination thereof.

Aspect 12. The process defined in any one of aspects 7-9, wherein the silicon compound comprises a Silbond® silicate.

Aspect 13. The process defined in any one of aspects 7-12, wherein the amount of silica component II, based on total amount of silica component I and silica component II, is in any suitable range or any range disclosed herein, e.g., from about 10 to about 90 wt. %, from about 15 to about 60 wt. %, from about 20 to about 80 wt. %, etc.

Aspect 14. The process defined in any one of aspects 7-13, wherein forming (co-gelling) the silica composite in the mixture includes any suitable technique for forming the silica composite or any technique disclosed herein, e.g., adjusting the pH of the mixture, removing water from and/or heating the mixture, adding a metal ion to the mixture, adding an organic solvent (e.g., an alcohol) to the mixture, storing the mixture for a suitable period of time, etc., or any combination thereof.

Aspect 15. The process defined in any one of aspects 1-14, wherein silica component I comprises a fumed silica (pyrogenic silica), a diatomaceous earth, a silica-rich clay (e.g., montmorillonite), or any combination thereof.

Aspect 16. The process defined in any one of aspects 1-14, wherein silica component I comprises a Cab-o-sil® fumed silica, an Aerosil® fumed silica, or any combination thereof.

Aspect 17. The process defined in any one of aspects 1-14, wherein silica component I is non-porous.

Aspect 18. The process defined in any one of aspects 1-17, wherein the average aspect ratio of silica component I is in any suitable range or any range disclosed herein, e.g., at least about 3:1, at least about 5:1, at least about 10:1, from about 2:1 to about 50:1, from about 3:1 to about 50:1, from about 5:1 to about 50:1, etc.

Aspect 19. The process defined in any one of aspects 1-18, wherein the BET surface area of silica component I is in any suitable range or any range disclosed herein, e.g., from about 150 to about 600 m$^2$/g, from about 200 to about 500 m$^2$/g, etc.

Aspect 20. The process defined in any one of aspects 1-19, wherein silica component I is further characterized by a d50 average particle size in any suitable range or any range disclosed herein, e.g., from about 5 to about 500 nm, from about 10 to about 300 nm, etc.

Aspect 21. The process defined in any one of aspects 1-20, wherein step (1) comprises combining (in any order) a titanium-containing compound with silica component I and silica component II in the diluent or solvent.

Aspect 22. The process defined in any one of aspects 1-21, further comprising a step of drying the silica composite, a step of calcining the silica composite, or both.

Aspect 23. A silica composite prepared by the process defined in any one of aspects 1-22.

Aspect 24. A silica composite (composition) characterized by:
a bulk density in a range from about 0.08 to about 0.4 g/mL;
a total pore volume from about 0.4 to about 2.5 mL/g;
a BET surface area from about 175 to about 375 m$^2$/g; and
a peak pore diameter from about 10 to about 80 nm.

Aspect 25. A process for preparing a supported chromium catalyst, the process comprising:
(1) combining (in any order) a chromium-containing compound and an optional titanium-containing compound with silica component I and silica component II in the diluent or solvent as defined in any one of aspects 1-22 to form a mixture; and
(2) forming the supported chromium compound in the mixture; wherein:
the supported chromium catalyst is characterized by:
a bulk density in a range from about 0.08 to about 0.4 g/mL;
a total pore volume from about 0.4 to about 2.5 mL/g;
a BET surface area from about 175 to about 375 m$^2$/g; and
a peak pore diameter from about 10 to about 80 nm.

Aspect 26. A process for preparing a supported chromium catalyst, the process comprising:
performing step (1) and step (2) as defined in any one of aspects 1-22; and
(3) combining (in any order) a chromium-containing compound and an optional titanium-containing compound with the silica composite to form the supported chromium catalyst; wherein:
the supported chromium catalyst is characterized by:
a bulk density in a range from about 0.08 to about 0.4 g/mL;
a total pore volume from about 0.4 to about 2.5 mL/g;
a BET surface area from about 175 to about 375 m$^2$/g; and
a peak pore diameter from about 10 to about 80 nm.

Aspect 27. A process for preparing a supported chromium catalyst, the process comprising:
combining (before calcining or during calcining) a chromium-containing compound and an optional titanium-containing compound with the silica composite defined in Aspect 23 or 24 to form the supported chromium catalyst; wherein:
the supported chromium catalyst is characterized by:
a bulk density in a range from about 0.08 to about 0.4 g/mL;
a total pore volume from about 0.4 to about 2.5 mL/g;
a BET surface area from about 175 to about 375 m$^2$/g; and
a peak pore diameter from about 10 to about 80 nm.

Aspect 28. The process defined in any one of aspects 25-27, wherein the catalyst contains any suitable amount of chromium or an amount in any range disclosed herein, e.g., from about 0.1 to about 15 wt. %, from about 0.5 to about 5 wt. %, from about 0.5 to about 2.5 wt. %, etc., based on the total weight of the catalyst.

Aspect 29. The process defined in any one of aspects 25-28, wherein the chromium-containing compound comprises any suitable chromium (II) compound or any chromium (II) compound disclosed herein, e.g., chromium (II) acetate, chromium (II) chloride, chromium (II) bromide, chromium (II) iodide, chromium (II) sulfate, etc., or any combination thereof.

Aspect 30. The process defined in any one of aspects 25-28, wherein the chromium-containing compound comprises any suitable chromium (III) compound or any chromium (III) compound disclosed herein, e.g., a chromium (III) carboxylate, a chromium (III) naphthenate, a chromium (III) halide, chromium (III) sulfate, chromium (III) nitrate, a chromium (III) dionate, chromium (III) acetate, chromium (III) acetylacetonate, chromium (III) chloride, chromium (III) bromide, etc., or any combination thereof.

Aspect 31. The process defined in any one of aspects 25-30, wherein the catalyst contains any suitable amount of titanium or an amount in any range disclosed herein, e.g., from about 0.5 to about 10 wt. %, from about 1 to about 6 wt. %, from about 1.5 to about 5 wt. %, etc., based on the total weight of the catalyst.

Aspect 32. The process defined in any one of aspects 25-31, wherein the titanium compound comprises any suitable titanium compound or any titanium compound disclosed herein, e.g., a Ti (III) compound, a Ti (IV) compound, etc., or any combination thereof.

Aspect 33. The process defined in any one of aspects 25-31, wherein the titanium compound comprises any suitable titanium compound or any titanium compound disclosed herein, e.g., a titanium alkoxide (e.g., titanium isopropoxide, titanium n-propoxide), a titanium halide or oxohalide, a titanium acetylacetonate complex, a triethanolamine titanium complex, a titanium carboxylate (e.g. oxalate, citrate, lactate, etc.), etc., or chelated or modified versions thereof, as well as any combination thereof.

Aspect 34. The process defined in any one of aspects 25-33, further comprising a step of drying the supported chromium catalyst.

Aspect 35. The process defined in any one of aspects 25-34, further comprising a step of calcining the supported chromium catalyst.

Aspect 36. A supported chromium catalyst prepared by the process defined in any one of aspects 25-35.

Aspect 37. A supported chromium catalyst comprising a silica composite and from about 0.1 to about 15 wt. % chromium, wherein the catalyst is characterized by:
 a bulk density in a range from about 0.08 to about 0.4 g/mL;
 a total pore volume from about 0.4 to about 2.5 mL/g;
 a BET surface area from about 175 to about 375 $m^2/g$; and
 a peak pore diameter from about 10 to about 80 nm.

Aspect 38. The catalyst defined in aspect 36 or 37, wherein the catalyst contains any suitable amount of chromium or an amount in any range disclosed herein, e.g., from about 0.5 to about 15 wt. %, from about 0.5 to about 5 wt. %, from about 0.5 to about 2.5 wt. %, etc., based on the total weight of the catalyst.

Aspect 39. The catalyst defined in any one of aspects 36-38, wherein at least about 75 wt. %, at least about 80 wt. %, at least about 90 wt. %, at least about 95 wt. %, etc., of the chromium is present in an oxidation state of three or less (e.g., the catalyst is pre-calcined).

Aspect 40. The catalyst defined in any one of aspects 36-38, wherein at least about 30 wt. %, at least about 50 wt. %, at least about 60 wt. %, at least about 80 wt. %, at least about 90 wt. %, etc., of the chromium is present as hexavalent chromium (e.g., the catalyst is calcined).

Aspect 41. The catalyst defined in any one of aspects 36-40, wherein the catalyst further contains any suitable amount of titanium or an amount in any range disclosed herein, e.g., from about 0.5 to about 10 wt. %, from about 1 to about 6 wt. %, from about 1.5 to about 5 wt. %, etc., based on the total weight of the catalyst.

Aspect 42. The process, silica composite, or supported chromium catalyst defined in any one of the preceding aspects, wherein the silica composite and the supported chromium catalyst, independently, have a bulk density in any suitable range or any range disclosed herein, e.g., from about 0.08 to about 0.35 g/mL, from about 0.1 to about 0.35 g/mL, from about 0.1 to about 0.32 g/mL, from about 0.12 to about 0.34 g/mL, etc.

Aspect 43. The process, silica composite, or supported chromium catalyst defined in any one of the preceding aspects, wherein the silica composite and the supported chromium catalyst, independently, have a total pore volume in any suitable range or any range disclosed herein, e.g., from about 0.5 to about 3.5 mL/g, from about 0.4 to about 1.5 mL/g, from about 0.5 to about 2 mL/g, from about 0.5 to about 1.3 mL/g, etc.

Aspect 44. The process, silica composite, or supported chromium catalyst defined in any one of the preceding aspects, wherein the silica composite and the supported chromium catalyst, independently, have a BET surface area in any suitable range or any range disclosed herein, e.g., from about 175 to about 360 $m^2/g$, from about 190 to about 375 $m^2/g$, from about 200 to about 360 $m^2/g$, etc.

Aspect 45. The process, silica composite, or supported chromium catalyst defined in any one of the preceding aspects, wherein the silica composite and the supported chromium catalyst, independently, have a peak pore diameter in any suitable range or any range disclosed herein, e.g., from about 10 to about 70 nm, from about 10 to about 50 nm, from about 15 to about 60 nm, from about 15 to about 50 nm, from about 17 to about 40 nm, from about 20 to about 80 nm, from about 20 to about 50 nm, from about 25 nm to about 60 nm, etc.

Aspect 46. The process, silica composite, or supported chromium catalyst defined in any one of the preceding aspects, wherein the silica composite and the supported chromium catalyst, independently, have an average pore diameter in any suitable range or any range disclosed herein, e.g., from about 8 to about 70 nm, from about 9 to about 50 nm, from about 9 to about 30 nm, from about 10 to about 50 nm, etc.

Aspect 47. The process, silica composite, or supported chromium catalyst defined in any one of the preceding aspects, wherein the silica composite and the supported chromium catalyst, independently, have any suitable percentage of the total pore volume in pores with diameters in the 10-50 nm range (or 10-100 nm range) or an amount in any range disclosed herein, e.g., at least about 35%, at least about 40%, from about 35 to about 95%, from about 40 to about 85%, etc.

Aspect 48. The process, silica composite, or supported chromium catalyst defined in any one of the preceding aspects, wherein the silica composite and the supported chromium catalyst, independently, have any suitable percentage of the total pore volume in pores with diameters in the 30-100 nm range or an amount in any range disclosed herein, e.g., from about 0.5 to about 40%, from about 0.5 to about 35%, from about 1 to about 35%, from about 2 to about 35%, etc.

Aspect 49. The process, silica composite, or supported chromium catalyst defined in any one of the preceding aspects, wherein the silica composite and the supported chromium catalyst, independently, have any suitable percentage of the total pore volume in pores with diameters of less than or equal to 10 nm or an amount in any range disclosed herein, e.g., less than or equal to about 65%, less than or equal to about 60%, from about 5 to about 65%, from about 15 to about 55%, etc.

Aspect 50. The process, silica composite, or supported chromium catalyst defined in any one of the preceding aspects, wherein the silica composite and the supported chromium catalyst, independently, have any suitable percentage of the total pore volume in pores with diameters of less than or equal to 5 nm or an amount in any range disclosed herein, e.g., less than or equal to about 25%, less than or equal to about 20%, from about 1 to about 25%, from about 2 to about 15%, etc.

Aspect 51. The process, silica composite, or supported chromium catalyst defined in any one of the preceding aspects, wherein the silica composite and the supported chromium catalyst, independently, have any suitable percentage of the total pore volume in pores with diameters of less than or equal to 3 nm or an amount in any range disclosed herein, e.g., less than or equal to about 8%, less than or equal to about 7%, less than or equal to about 6%, less than or equal to about 4%, etc.

Aspect 52. The process, silica composite, or supported chromium catalyst defined in any one of the preceding aspects, wherein the silica composite and the supported chromium catalyst, independently, have any suitable pore volume of pores with diameters in the 10-50 nm range (or 10-100 nm range) or an amount in any range disclosed herein, e.g., at least about 0.2 mL/g, at least about 0.3 mL/g, from about 0.2 to about 1.5 mL/g, from about 0.4 to about 1.3 mL/g, etc.

Aspect 53. The process, silica composite, or supported chromium catalyst defined in any one of the preceding aspects, wherein the silica composite and the supported chromium catalyst, independently, have any suitable percentage of the total surface area in pores with diameters in the 10-50 nm range (or 10-100 nm range) or an amount in any range disclosed herein, e.g., at least about 15%, at least about 20%, from about 15 to about 65%, from about 20 to about 60%, etc.

Aspect 54. The process, silica composite, or supported chromium catalyst defined in any one of the preceding aspects, wherein the silica composite and the supported chromium catalyst, independently, have any suitable percentage of the surface area in pores with diameters of less than or equal to 5 nm or an amount in any range disclosed herein, e.g., less than or equal to about 50%, less than or equal to about 30%, from about 5 to about 50%, from about 5 to about 30%, etc.

Aspect 55. The process, silica composite, or supported chromium catalyst defined in any one of the preceding aspects, wherein the silica composite and the supported chromium catalyst, independently, have any suitable surface area of pores with diameters in the 10-50 nm range (or 10-100 nm range) or an amount in any range disclosed herein, e.g., at least about 40 m$^2$/g, at least about 50 m$^2$/g, from about 40 to about 200 m$^2$/g, from about 60 to about 180 m$^2$/g, etc.

Aspect 56. The process, silica composite, or supported chromium catalyst defined in any one of the preceding aspects, wherein the silica composite and the supported chromium catalyst, independently, have any suitable average (d50) particle size or an average (d50) particle size in any range disclosed herein, e.g., from about 10 to about 500 microns, from about 25 to about 250 microns, from about 40 to about 160 microns, etc.

Aspect 57. An olefin polymerization process, the process comprising contacting the (activated) supported chromium catalyst defined in any one of aspects 36-56 and an optional co-catalyst with an olefin monomer and an optional olefin comonomer in a polymerization reactor system under polymerization conditions to produce an olefin polymer.

Aspect 58. The olefin polymerization process defined in aspect 57, wherein a co-catalyst is used, and the co-catalyst comprises any suitable co-catalyst or any co-catalyst disclosed herein, e.g., an aluminoxane co-catalyst, an organoaluminum co-catalyst, an organoboron co-catalyst, etc., or any combination thereof.

Aspect 59. The olefin polymerization process defined in aspect 57 or 58, wherein the catalyst has any suitable productivity or any productivity disclosed herein, e.g., from about 500 to about 5000 g/g, from about 800 to about 4000 g/g, from about 1000 to about 3000 g/g, etc.

Aspect 60. The olefin polymerization process defined in any one of aspects 57-59, wherein the olefin monomer comprises any olefin monomer disclosed herein, e.g., any $C_2$-$C_{20}$ olefin.

Aspect 61. The olefin polymerization process defined in any one of aspects 57-60, wherein the olefin monomer and the optional olefin comonomer independently comprise a $C_2$-$C_{20}$ alpha-olefin.

Aspect 62. The olefin polymerization process defined in any one of aspects 57-61, wherein the olefin monomer comprises ethylene.

Aspect 63. The olefin polymerization process defined in any one of aspects 57-62, wherein the catalyst is contacted with ethylene and an olefin comonomer comprising a $C_3$-$C_{10}$ alpha-olefin.

Aspect 64. The olefin polymerization process defined in any one of aspects 57-63, wherein the catalyst is contacted with ethylene and an olefin comonomer comprising 1-butene, 1-hexene, 1-octene, or a mixture thereof.

Aspect 65. The olefin polymerization process defined in any one of aspects 57-61, wherein the olefin monomer comprises propylene.

Aspect 66. The olefin polymerization process defined in any one of aspects 57-65, wherein the polymerization reactor system comprises a batch reactor, a slurry reactor, a gas-phase reactor, a solution reactor, a high pressure reactor, a tubular reactor, an autoclave reactor, or a combination thereof.

Aspect 67. The olefin polymerization process defined in any one of aspects 57-66, wherein the polymerization reactor system comprises a slurry reactor, a gas-phase reactor, a solution reactor, or a combination thereof.

Aspect 68. The olefin polymerization process defined in any one of aspects 57-67, wherein the polymerization reactor system comprises a loop slurry reactor.

Aspect 69. The olefin polymerization process defined in any one of aspects 57-68, wherein the polymerization reactor system comprises a single reactor.

Aspect 70. The olefin polymerization process defined in any one of aspects 57-68, wherein the polymerization reactor system comprises 2 reactors.

Aspect 71. The olefin polymerization process defined in any one of aspects 57-68, wherein the polymerization reactor system comprises more than 2 reactors.

Aspect 72. The olefin polymerization process defined in any one of aspects 57-71, wherein the olefin polymer comprises any olefin polymer disclosed herein.

Aspect 73. The olefin polymerization process defined in any one of aspects 57-64 or 66-72, wherein the olefin polymer comprises an ethylene homopolymer, an ethylene/1-butene copolymer, an ethylene/1-hexene copolymer, and/or an ethylene/1-octene copolymer.

Aspect 74. The olefin polymerization process defined in any one of aspects 57-61 and 65-72, wherein the olefin polymer comprises a polypropylene homopolymer and/or a propylene-based copolymer.

Aspect 75. The olefin polymerization process defined in any one of aspects 57-74, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 76. The olefin polymerization process defined in any one of aspects 57-75, wherein the polymerization conditions are substantially constant, e.g., for a particular polymer grade.

Aspect 77. The olefin polymerization process defined in any one of aspects 57-76, wherein no hydrogen is added to the polymerization reactor system.

Aspect 78. The olefin polymerization process defined in any one of aspects 57-76, wherein hydrogen is added to the polymerization reactor system.

Aspect 79. The olefin polymerization process defined in any one of aspects 57-78, wherein the olefin polymer has a density in any range disclosed herein, e.g., from about 0.90 to about 0.97, from about 0.92 to about 0.96, from about 0.93 to about 0.955, from about 0.94 to about 0.955 g/cm$^3$, etc.

Aspect 80. The olefin polymerization process defined in any one of aspects 57-79, wherein the olefin polymer has a HLMI in any range disclosed herein, e.g., from about 1 to about 80, from about 1 to about 50, from about 1 to about 40, from about 2 to about 40 g/10 min, etc.

Aspect 81. The olefin polymerization process defined in any one of aspects 57-80, wherein the olefin polymer has a ratio of $I_{21}/I_{10}$ in any range disclosed herein, e.g., from about 3 to about 12, from about 4 to about 10, from about 4.5 to about 9, etc.

Aspect 82. The olefin polymerization process defined in any one of aspects 57-81, wherein the olefin polymer has a ratio of Mw/Mn in any range disclosed herein, e.g., from about 5 to about 40, from about 7 to about 25, from about 8 to about 18, etc.

Aspect 83. The olefin polymerization process defined in any one of aspects 57-82, wherein the olefin polymer has a ratio of Mz/Mw in any range disclosed herein, e.g., from about 5 to about 10, from about 5 to about 9, from about 6 to about 8, etc.

Aspect 84. The olefin polymerization process defined in any one of aspects 57-83, wherein the olefin polymer has Mw in any range disclosed herein, e.g., from about 150 to about 500 kg/mol, from about 200 to about 400 kg/mol, from about 180 to about 350 kg/mol, etc.

Aspect 85. The olefin polymerization process defined in any one of aspects 57-84, wherein the olefin polymer has a CY-a parameter in any range disclosed herein, e.g., from about 0.1 to about 0.3, from about 0.12 to about 0.28, from about 0.15 to about 0.25, etc.

Aspect 86. An olefin polymer produced by the olefin polymerization process defined in any one of aspects 57-85.

Aspect 87. An article of manufacture comprising the polymer defined in aspect 86.

Aspect 88. The article defined in aspect 87, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. A silica composite characterized by:
   a bulk density from about 0.08 to about 0.4 g/mL;
   a total pore volume from about 0.4 to about 2.5 mL/g;
   a BET surface area from about 175 to about 375 m$^2$/g; and
   a peak pore diameter from about 10 to about 80 nm;
   wherein from about 0.5 to about 40% of the total pore volume of the silica composite is in pores with diameters in the 30-100 nm range.

2. The silica composite of claim 1, wherein the silica composite has an average pore diameter from about 10 to about 50 nm.

3. The silica composite of claim 1, wherein:
   the bulk density is from about 0.1 to about 0.35 g/mL;
   the total pore volume is from about 0.5 to about 2 mL/g;
   the BET surface area is from about 200 to about 375 m$^2$/g; and
   the peak pore diameter is from about 15 to about 50 nm.

4. The silica composite of claim 1, wherein:
   from about 40 to about 85% of the total pore volume of the silica composite is in pores with diameters in the 10-50 nm range;
   from about 1 to about 25% of the total pore volume of the silica composite is in pores with diameters of less than or equal to 5 nm; and
   less than or equal to about 4% of the total pore volume of the silica composite is in pores with diameters of less than or equal to 3 nm.

5. The silica composite of claim 1, wherein from about 1 to about 35% of the total pore volume of the silica composite is in pores with diameters in the 30-100 nm range.

6. The silica composite of claim 1, wherein from about 2 to about 35% of the total pore volume of the silica composite is in pores with diameters in the 30-100 nm range.

7. The silica composite of claim 1, wherein the silica composite has an average pore diameter from about 9 to about 30 nm.

8. The silica composite of claim 1, wherein from about 40 to about 85% of the total pore volume of the silica composite is in pores with diameters in the 10-50 nm range.

9. The silica composite of claim 1, wherein:
   from about 1 to about 25% of the total pore volume of the silica composite is in pores with diameters of less than or equal to 5 nm; and
   less than or equal to about 4% of the total pore volume of the silica composite is in pores with diameters of less than or equal to 3 nm.

10. The silica composite of claim 1, wherein:
    the silica composite has an average pore diameter from about 10 to about 50 nm;
    from about 1 to about 25% of the total pore volume of the silica composite is in pores with diameters of less than or equal to 5 nm; and
    less than or equal to about 4% of the total pore volume of the silica composite is in pores with diameters of less than or equal to 3 nm.

11. The silica composite of claim 3, wherein:
    from about 40 to about 85% of the total pore volume of the silica composite is in pores with diameters in the 10-50 nm range;
    from about 1 to about 25% of the total pore volume of the silica composite is in pores with diameters of less than or equal to 5 nm; and
    less than or equal to about 4% of the total pore volume of the silica composite is in pores with diameters of less than or equal to 3 nm.

12. The silica composite of claim 3, wherein the silica composite has an average pore diameter from about 10 to about 50 nm.

13. The silica composite of claim 12, wherein from about 1 to about 35% of the total pore volume of the silica composite is in pores with diameters in the 30-100 nm range.

14. The silica composite of claim 3, wherein from about 40 to about 85% of the total pore volume of the silica composite is in pores with diameters in the 10-50 nm range.

15. The silica composite of claim 3, wherein:
from about 1 to about 25% of the total pore volume of the silica composite is in pores with diameters of less than or equal to 5 nm; and
less than or equal to about 4% of the total pore volume of the silica composite is in pores with diameters of less than or equal to 3 nm.

16. The silica composite of claim 3, wherein:
the silica composite has an average pore diameter from about 10 to about 50 nm;
from about 1 to about 25% of the total pore volume of the silica composite is in pores with diameters of less than or equal to 5 nm; and
less than or equal to about 4% of the total pore volume of the silica composite is in pores with diameters of less than or equal to 3 nm.

17. The silica composite of claim 3, wherein from about 2 to about 35% of the total pore volume of the silica composite is in pores with diameters in the 30-100 nm range.

18. The silica composite of claim 3, wherein the silica composite has an average pore diameter from about 9 to about 30 nm.

19. A silica composite characterized by:
a bulk density from about 0.08 to about 0.4 g/mL;
a total pore volume from about 0.4 to about 2.5 mL/g;
a BET surface area from about 175 to about 375 m$^2$/g; and
a peak pore diameter from about 10 to about 80 nm;
wherein from about 40 to about 85% of the total pore volume of the silica composite is in pores with diameters in the 10-50 nm range.

20. The silica composite of claim 19, wherein the silica composite has an average pore diameter from about 10 to about 50 nm.

21. The silica composite of claim 19, wherein the silica composite has an average pore diameter from about 9 to about 30 nm.

22. The silica composite of claim 19, wherein from about 2 to about 35% of the total pore volume of the silica composite is in pores with diameters in the 30-100 nm range.

23. The silica composite of claim 19, wherein:
the bulk density is from about 0.1 to about 0.35 g/mL;
the total pore volume is from about 0.5 to about 2 mL/g;
the BET surface area is from about 200 to about 375 m$^2$/g; and
the peak pore diameter is from about 15 to about 50 nm.

24. The silica composite of claim 23, wherein less than or equal to about 20% of the total pore volume of the silica composite is in pores with diameters of less than or equal to 5 nm.

25. The silica composite of claim 19, wherein:
the bulk density is from about 0.12 to about 0.34 g/mL;
the total pore volume is from about 0.4 to about 1.5 mL/g;
the BET surface area is from about 190 to about 375 m$^2$/g; and
the peak pore diameter is from about 17 to about 40 nm.

26. The silica composite of claim 25, wherein less than or equal to about 4% of the total pore volume of the silica composite is in pores with diameters of less than or equal to 3 nm.

27. A silica composite characterized by:
a bulk density from about 0.08 to about 0.4 g/mL;
a total pore volume from about 0.4 to about 2.5 mL/g;
a BET surface area from about 175 to about 375 m$^2$/g; and
a peak pore diameter from about 10 to about 80 nm; wherein:
from about 1 to about 25% of the total pore volume of the silica composite is in pores with diameters of less than or equal to 5 nm; and
less than or equal to about 4% of the total pore volume of the silica composite is in pores with diameters of less than or equal to 3 nm.

28. The silica composite of claim 27, wherein the silica composite has an average pore diameter from about 9 to about 30 nm.

29. The silica composite of claim 27, wherein:
the bulk density is from about 0.1 to about 0.35 g/mL;
the total pore volume is from about 0.5 to about 2 mL/g;
the BET surface area is from about 200 to about 375 m$^2$/g; and
the peak pore diameter is from about 15 to about 50 nm.

* * * * *